United States Patent
Yamagishi

(10) Patent No.: US 12,081,317 B2
(45) Date of Patent: Sep. 3, 2024

(54) INFORMATION PROCESSING APPARATUS, CLIENT APPARATUS, AND DATA PROCESSING METHOD

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 1165 days.

(21) Appl. No.: 16/319,558

(22) PCT Filed: Aug. 4, 2017

(86) PCT No.: PCT/JP2017/028338
§ 371 (c)(1),
(2) Date: Jan. 22, 2019

(87) PCT Pub. No.: WO2018/034172
PCT Pub. Date: Feb. 22, 2018

(65) Prior Publication Data
US 2021/0288735 A1    Sep. 16, 2021

(30) Foreign Application Priority Data
Aug. 19, 2016    (JP) .................................. 2016-161194

(51) Int. Cl.
*H04H 60/37* (2008.01)
*H04H 60/25* (2008.01)
(Continued)

(52) U.S. Cl.
CPC ............ *H04H 60/37* (2013.01); *H04H 60/25* (2013.01); *H04H 60/31* (2013.01);
(Continued)

(58) Field of Classification Search
CPC ........ H04H 60/37; H04H 60/25; H04H 60/31; H04H 60/35; H04H 60/82;
(Continued)

(56) References Cited

U.S. PATENT DOCUMENTS 7,904,951 B1 * 3/2011 Ebrahimi ............ H04L 63/0884
713/153
8,166,141 B1 * 4/2012 Van Horne, III ....... H04L 67/02
709/225
(Continued)

FOREIGN PATENT DOCUMENTS

JP    2007-110586 A    4/2007
JP    2010-527048 A    8/2010
(Continued)

OTHER PUBLICATIONS

International Search Report issued on Oct. 24, 2017 in PCT/JP2017/028338 filed on Aug. 4, 2017.
(Continued)

*Primary Examiner* — Oschta I Montoya
(74) *Attorney, Agent, or Firm* — Richard LaPeruta

(57) ABSTRACT

The present technology relates to an information processing apparatus enabling services using broadcasting and communication to be more flexibly served, a client apparatus, and a data processing method.
An information processing apparatus inserts identification information for identifying the identity of a source of content into a request for the content to more flexibly serve services using broadcasting and communication. For example, the present technology can be applied to a gateway apparatus connected to a network such as home LAN or a client apparatus capable of reproducing content.

20 Claims, 29 Drawing Sheets

(51) Int. Cl.
  *H04H 60/31* (2008.01)
  *H04L 61/2517* (2022.01)
  *H04L 65/1045* (2022.01)
  *H04L 65/1101* (2022.01)
  *H04L 67/02* (2022.01)

(52) U.S. Cl.
  CPC ...... *H04L 61/2517* (2013.01); *H04L 65/1045* (2022.05); *H04L 65/1101* (2022.05); *H04L 67/02* (2013.01)

(58) Field of Classification Search
  CPC ......... H04L 29/06027; H04L 29/06285; H04L 29/0809; H04L 29/12377; H04N 21/26258; H04N 21/43615; H04N 21/4363; H04N 21/437; H04N 21/6112; H04N 21/6175; H04N 21/6181; H04N 21/8352; H04N 21/8456; H04N 21/23614
  See application file for complete search history.

(56) References Cited

U.S. PATENT DOCUMENTS

| | | | |
|---|---|---|---|
| 2004/0006573 | A1 | 1/2004 | Takashi |
| 2008/0232371 | A1 | 9/2008 | Hildreth et al. |
| 2011/0154417 | A1* | 6/2011 | Civanlar ................. H04N 7/15 |
| | | | 725/105 |
| 2013/0028118 | A1 | 1/2013 | Cherian et al. |
| 2013/0073638 | A1 | 3/2013 | Saiki et al. |
| 2014/0372624 | A1* | 12/2014 | Wang ................... H04L 12/189 |
| | | | 709/231 |
| 2015/0012584 | A1* | 1/2015 | Lo .......................... H04L 67/563 |
| | | | 709/203 |
| 2015/0341830 | A1* | 11/2015 | Jeong .................... H04W 24/02 |
| | | | 370/329 |
| 2015/0365483 | A1* | 12/2015 | Xiong ................... H04W 80/06 |
| | | | 709/203 |
| 2019/0058628 | A1* | 2/2019 | Boucadair ............... H04L 45/28 |
| 2021/0195254 | A1* | 6/2021 | Oh ..................... H04N 21/2362 |

FOREIGN PATENT DOCUMENTS

| | | |
|---|---|---|
| JP | 2013-80988 A | 5/2013 |
| JP | 2013-131882 A | 7/2013 |
| JP | 2013-150089 A | 8/2013 |
| WO | WO 02/103964 A1 | 12/2002 |

OTHER PUBLICATIONS

Extended European Search Report issued Jul. 30, 2019 in Patent Application No. 17841397.7, 11 pages.
Walker, G.K. et al. "ROUTE/DASH IP Streaming-Based System for Delivery of Broadcast, Broadband, and Hybrid Services" IEEE Transactions on Broadcasting, vol. 62, No. 1, XP011608972, 2016, pp. 328-337.
"ATSC Candidate Standard: Signaling, Delivery, Synchronization, and Error Protection (A1331)" Advanced Television Systems Committee, http://www.atsc.org/wp-content/uploads/2016/02/S33-174rt-Signaling-Delivery-Sync-FED.pdf, XP055476515, 2016, 131 pages.
"3rd Generation Partnership Project; Technical Specification Group Services and System Aspects; Multimedia Broadcast/Multicast Service (MBMS); Protocols and codecs (Release 12)", 3GPP TS 26.346 V12.10.0 (Jun. 2016), pp. 1-213.

* cited by examiner

FIG. 9

SegmentBase

```
<Representation mimeType="video/mp4"
                frameRate="24"
                bandwidth="1558322"
                codecs="avc1.4d401f" width="1277" height="544">
  <BaseURL>http://cdn.bitmovin.net/bbb/video-1500k.mp4</BaseURL>
  <SegmentBase indexRange="0-834"/>
</Representation>
```

FIG. 10

SegmentList

```
<Representation mimeType="video/mp4"
                frameRate="24"
                bandwidth="1558322"
                codecs="avc1.4d401f" width="1277" height="544">
  <SegmentList duration="10">
    <Initialization sourceURL="http://cdn.bitmovin.net/bbb/video-1500/init.mp4"/>
    <SegmentURL media="http://cdn.bitmovin.net/bbb/video-1500/segment-0.m4s"/>
    <SegmentURL media="http://cdn.bitmovin.net/bbb/video-1500/segment-1.m4s"/>
    <SegmentURL media="http://cdn.bitmovin.net/bbb/video-1500/segment-2.m4s"/>
    <SegmentURL media="http://cdn.bitmovin.net/bbb/video-1500/segment-3.m4s"/>
    <SegmentURL media="http://cdn.bitmovin.net/bbb/video-1500/segment-4.m4s"/>
  </SegmentList>
</Representation>
```

FIG. 11

SegmentTemplate

```
<Representation mimeType="video/mp4"
                frameRate="24"
                bandwidth="1558322"
                codecs="avc1.4d401f" width="1277" height="544">
<SegmentTemplate media="http://cdn.bitmovin.net/bbb/video-1500/segment-$Number$.m4s"
                 initialization="http://cdn.bitmovin.net/bbb/video-1500/init.mp4"
                 startNumber="0"
                 timescale="24"
                 duration="48"/>

</Representation>
```

FIG. 12

```
<MPD ...>
<Period ...>
<AdaptationSet ...>
<Representation ...>
<SegmentList ...>
<BaseURL>http://cdn1.com/</BaseURL>
<SegmentURL media="seg-201.mp4"/>
<SegmentURL media="seg-202.mp4"/>
  ...
</SegmentList>
</Representation>
<Representation ...>
<SegmentList ...>
<BaseURL>http://cdn2.com/</BaseURL>
<SegmentURL media="s101.mp4"/>
<SegmentURL media="s102.mp4"/>
  ...
</SegmentList>
</Representation>
</AdaptationSet>
</Period>
</MPD>
```

FIG. 13

```
ATSC3.0-Request = "atsc3.0-request" ":" *serviceAttribute
serviceAttribute =
    "service-id" "=" serviceId
    | contentId
    | "mpd-uri" "=" absoluteURI
    | "broadcastTime" "=" HTTP-date
contentId =
    "eidr" "=" EIDR
    | "ad-id" "=" Ad-ID
```

*FIG. 16*

```
GET /a.mp4 HTTP/1.1
HOST a.com
...
atsc3.0-request: service-id=urn:atsc:serviceId:NBCU-NFL-1, eidr=md:cid:EIDR:10.5240%2f0EFB-02C0-126E-8092-1E49-W, mpd-uri=http://a.com/a.mpd,
broadcastTime=Fri, 04 Jul 2016 23:54:58 GMT
...
```

FIG. 19

M-SEARCH REQUEST

M-SEARCH * HTTP/1.1
HOST: 239.255.255.250:1900
MAN: "ssdp:discover"
MX: seconds to delay response
ST: urn:atsc:proxy
USER-AGENT: OS/version product/version

FIG. 20

M-SEARCH RESPONSE

HTTP/1.1 200 OK
LOCATION: http://192.168.1.1:12345/deviceDescription.xml
CACHE-CONTROL: max-age=1800
EXT:
BOOTID.UPNP.ORG: 1
SERVER: OS/version UPnP/1.1 product/version
ST: urn:atsc:proxy

FIG. 21

DEVICE DESCRIPTION REQUEST

GET /deviceDescription.xml HTTP/1.1
HOST 192.168.1.1:12345
...

FIG. 22

DEVICE DESCRIPTION RESPONSE

HTTP/1.1 200 OK
Content-Type: application/xml; charset=utf-8

```
<root xmlns=" urn:schemas-upnp-org:device-1-0" >
  :
  <serviceList>
    <service>
      <serviceType>urn:atsc:proxy</serviceType>
      <serviceId>urn:UPnP:serviceId:1234</serviceId>
      <SCPDURL></SCPDURL>
      <controlURL>http://192.168.1.1:23456/getATSC3.0ProxyAddressPort</controlURL>
      :
    </service>
  </serviceList>
  :
</root>
```

FIG. 24

PROXY STANDBY ADDRESS/PORT REQUEST

GET /getATSC3.0ProxyAddressPort HTTP/1.1
HOST 192.168.1.1:23456
...

FIG. 25

PROXY STANDBY ADDRESS/PORT RESPONSE

HTTP/1.1 200 OK
Content-Type: application/text; charset=utf-8
...
192.168.1.1:34567

FIG. 26

PROXY AUTOCONFIGURATION SCRIPT FILE

```
function FindProxyForURL(url, host)
{ if(isPlainHostName(host) ||
    isInNet(host,"192.168.1.1","255.255.255.0")) return "DIRECT";
  else return "PROXY 192.168.1.1:34567; DIRECT";
}
```

INFORMATION PROCESSING APPARATUS, CLIENT APPARATUS, AND DATA PROCESSING METHOD

TECHNICAL FIELD

The present technology relates to an information processing apparatus, a client apparatus, and a data processing method, and particularly relates to an information processing apparatus enabling services using broadcasting and communication to be more flexibly served, a client apparatus, and a data processing method.

BACKGROUND ART

In recent years, there has been proposed a technology for services using not only broadcasting but also communication in order to enhance broadcasting services (see Patent Document 1, for example).

CITATION LIST

Patent Document

Patent Document 1: Japanese Patent Application Laid-Open No. 2013-150089

SUMMARY OF THE INVENTION

Problems to be Solved by the Invention

Incidentally, it is assumed that a device which accesses a communication server on the Internet with a broadcasting service as a service entry and a device which accesses a communication server on the Internet with the general Internet site as a service entry are present when services using broadcasting and communication are served.

In such a case, business operators such as broadcasters request to discriminate the devices and to manage access statistics, for example, but a technology system for meeting the request is not established at present.

The present technology has been made in view of such a situation, and is directed to enable services using broadcasting and communication to be more flexibly served.

Solutions to Problems

An information processing apparatus according to a first aspect of the present technology is an information processing apparatus including: a processing part configured to insert identification information for identifying the identity of a source of content into a request for the content.

The information processing apparatus according to the first aspect of the present technology may be an independent apparatus or an internal block configuring one apparatus. Further, a data processing method according to the first aspect of the present technology is for the information processing apparatus according to the first aspect of the present technology described above.

In the information processing apparatus and the data processing method according to the first aspect of the present technology, identification information for identifying the identity of a source of content is inserted into a request for the content.

A client apparatus according to a second aspect of the present technology is a client apparatus including: a processing part configured to process connection with a gateway apparatus configured to transfer content distributed via broadcasting or via communication; and a reproduction part configured to reproduce the content transferred from the gateway apparatus via a network, in which the gateway apparatus functions as a proxy, and the processing part establishes connection with the proxy on the basis of connection information associated with an IP address and a port number by which the proxy waits for a request, the connection information being provided from the gateway apparatus via the network.

The client apparatus according to the second aspect of the present technology may be an independent apparatus or an internal block configuring one apparatus. Further, a data processing method according to the second aspect of the present technology is for the client apparatus according to the second aspect of the present technology described above.

In the client apparatus and the data processing method according to the second aspect of the present technology, connection with a gateway apparatus for transferring content distributed via broadcasting or via communication is processed, and the content transferred from the gateway apparatus via a network are reproduced. Further, the gateway apparatus functions as a proxy, and connection with the proxy is established on the basis of connection information associated with an IP address and a port number by which the proxy waits for a request, which is provided from the gateway apparatus via the network.

Effects of the Invention

According to the first aspect and the second aspect of the present technology, it is possible to more flexibly serve services using broadcasting and communication.

Additionally, the effects described herein are not necessarily restrictive, and any effect described in the present disclosure may be obtained.

BRIEF DESCRIPTION OF DRAWINGS

FIG. 9 is a diagram illustrating exemplary MPD metadata in a case where SegmentBase is used.

FIG. 10 is a diagram illustrating exemplary MPD metadata in a case where Segment List is used.

FIG. 11 is a diagram illustrating exemplary MPD metadata in a case where Segment Template is used.

FIG. 12 is a diagram illustrating exemplary MPD metadata.

FIG. 13 is a diagram illustrating an exemplary extension header according to the present technology.

FIG. 16 is a diagram illustrating an exemplary HTTP request inserted with an extension header.

FIG. 19 is a diagram illustrating an exemplary M-SEARCH request.

FIG. 20 is a diagram illustrating an exemplary M-SEARCH response.

FIG. 21 is a diagram illustrating an exemplary device description request.

FIG. 22 is a diagram illustrating an exemplary device description response.

FIG. 23 is a diagram illustrating an exemplary device description.

FIG. 24 is a diagram illustrating an exemplary proxy standby address/port request.

FIG. 25 is a diagram illustrating an exemplary proxy standby address/port response.

FIG. 26 is a diagram illustrating an exemplary proxy autoconfiguration script file.

MODE FOR CARRYING OUT THE INVENTION

Figure 1:
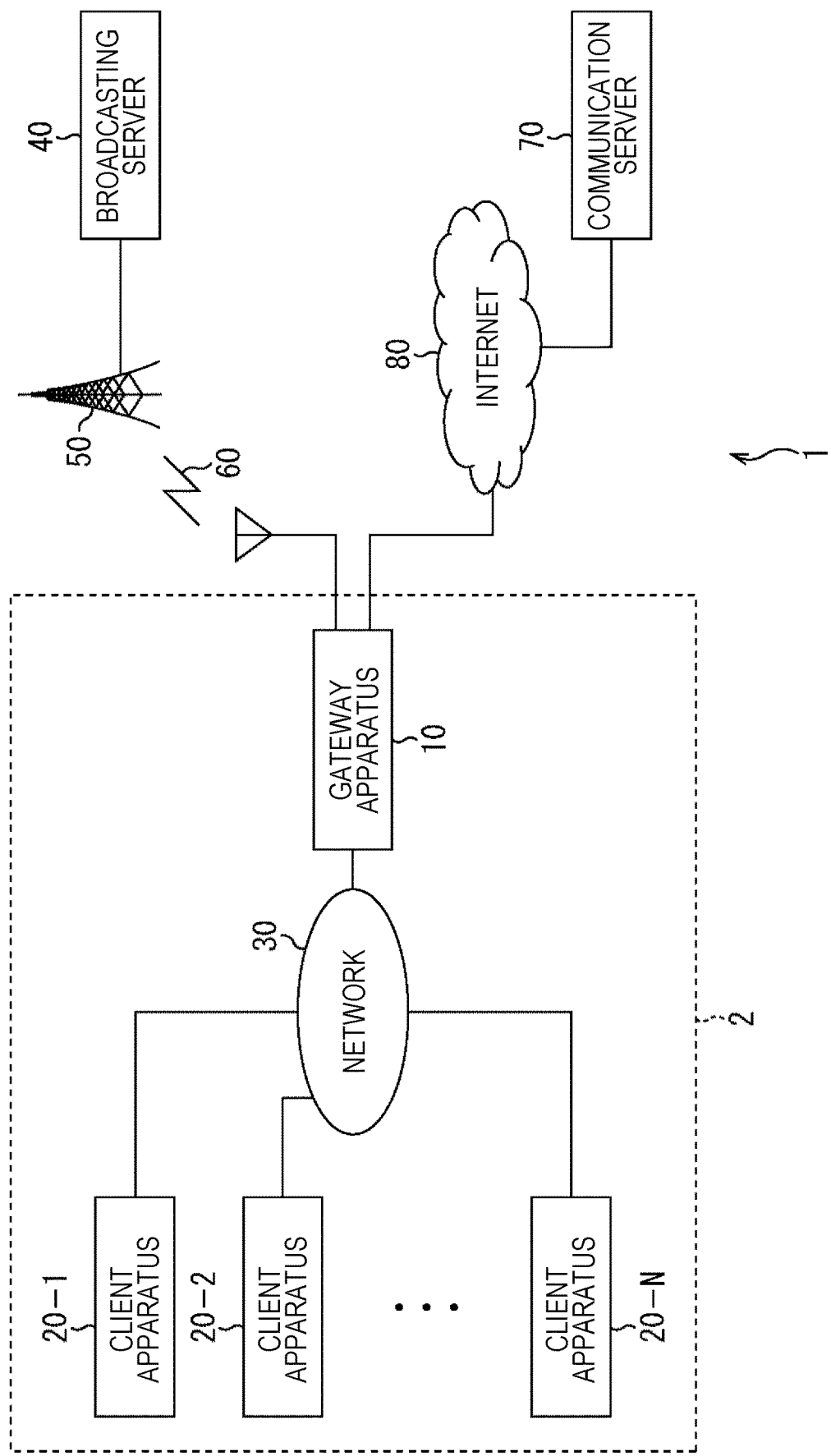
FIG. 1 is a diagram illustrating a configuration of one embodiment of a transmission system to which the present technology is applied.

An embodiment of the present technology will be described below with reference to the drawings. Additionally, the description will be made in the following order.

1. System configuration
2. Outline of present technology
3. HTTP request header extension method
4. Transparent proxy finding/connection method
5. Flow of proxy finding/connection processing and extension header insertion processing
6. Variants
7. Configuration of computer <1. System Configuration>
(Exemplary Configuration of Transmission System)

FIG. 1 is a diagram illustrating a configuration of one embodiment of a transmission system to which the present technology is applied. Additionally, a system indicates a logical collection of a plurality of apparatuses.

In FIG. 1, a transmission system 1 includes a gateway apparatus 10, client apparatuses 20-1 to 20-N (N: an integer of 1 or more), a broadcasting server 40, and a communication server 70.

In the transmission system 1, the gateway apparatus 10 and the client apparatuses 20-1 to 20-N are mutually connected via a network 30 such as a home local area network (LAN) constructed in an end user's home 2, and can make communication.

Further, the gateway apparatus 10 has a function of receiving a broadcasting wave transmitted from a transmission station 50 via a broadcasting transmission path 60, and a communication function capable of connecting to Internet 80. Thereby, the gateway apparatus 10 is mutually connected with the communication server 70 via the Internet 80, and can make communication therewith.

The gateway apparatus 10 is configured of, for example, a dedicated server configured to provide a gateway function, a TV receiver or set top box (STB) having a communication function, a network storage, and the like.

The gateway apparatus 10 receives a broadcasting wave transmitted from the broadcasting server 40 via the transmission station 50, and transmits (transfers) content data acquired from the broadcasting wave to the client apparatuses 20-1 to 20-N connected to the network 30.

Further, the gateway apparatus 10 receives content data transmitted from the communication server 70 via the Internet 80, and transmits (transfers) it to the client apparatuses 20-1 to 20-N connected to the network 30.

Additionally, a detailed configuration of the gateway apparatus 10 will be described below with reference to FIG. 2.

The client apparatus 20-1 is a receiver configured to receive and reproduce content transmitted (transferred) from the gateway apparatus 10 via the network 30. That is, the client apparatus 20-1 can reproduce content broadcasting- or communication-distributed via the gateway apparatus 10 in response to an operation of the end user, or the like.

The client apparatus 20-1 is a fixed receiver such as a TV receiver or set top box, or a mobile receiver such as a smartphone, cell phone, or tablet computer.

The client apparatuses 20-2 to 20-N are each configured of a fixed receiver used at home or a mobile receiver similarly to the client apparatus 20-1, and receive and reproduce content broadcasting- or communication-distributed via the gateway apparatus 10.

Additionally, in a case where the client apparatuses 20-1 to 20-N do not need to be particularly discriminated, they will be simply referred to as the client apparatus 20 in the following description. In addition, a detailed configuration of the client apparatus 20 will be described below with reference to FIG. 3.

The broadcasting server 40 is provided by a broadcaster such as a broadcasting station, for example, and is connected to delivery equipment installed in the transmission station 50 via a predetermined line such as a dedicated line.

The broadcasting server 40 processes content files (data) of programs, CMs, and the like, or control information (signaling), and transmits the resultant data to the delivery equipment in the transmission station 50 via a dedicated line. The delivery equipment in the transmission station 50 then performs a necessary processing (such as modulation processing) on the data from the broadcasting server 40, and thus the resultant broadcasting wave is received by the gateway apparatus 10 at the end user's home 2 via the broadcasting transmission path 60.

The communication server 70 is provided by a broadcaster such as a broadcasting station, or other business operator, for example, and is connected to the Internet 80.

The communication server 70 processes the content files of programs, CMs, and the like, or the control information in response to a request from the gateway apparatus 10, and transmits (streams) the resultant data via the Internet 80.

Additionally, the description has been made assuming that the gateway apparatus 10 and the client apparatuses 20 are arranged within the end user's home 2 in the transmission system of FIG. 1, but the gateway apparatus 10 may be installed at a head end of a cable operator, a base station of a mobile network, or the like, for example, not limited to within the end user's home 2, thereby covering a wider range of region.

That is, for example, in a case where the gateway apparatus 10 is installed at a head end of a cable operator, the client apparatuses 20 are installed not within the same end user's home but within the respective end users' homes which contract the cable TV service. Further, for example, in a case where the gateway apparatus 10 is installed in a base station of a mobile network, the client apparatuses 20 are devices owned by the end users who contract the mobile service indoors or outdoors.

Further, the client apparatus 20 may be a vehicle-mounted device which is mounted on a vehicle. Further, in the transmission system 1 of FIG. 1, communication made between devices or servers connected to the network 30 or the Internet 80 may be wireless communication, wired communication, or mixed communication of wireless communication and wired communication, that is, wireless communication may be made in a zone and wired communication may be made in other zone.

(Configuration of Gateway Apparatus)

Figure 2:
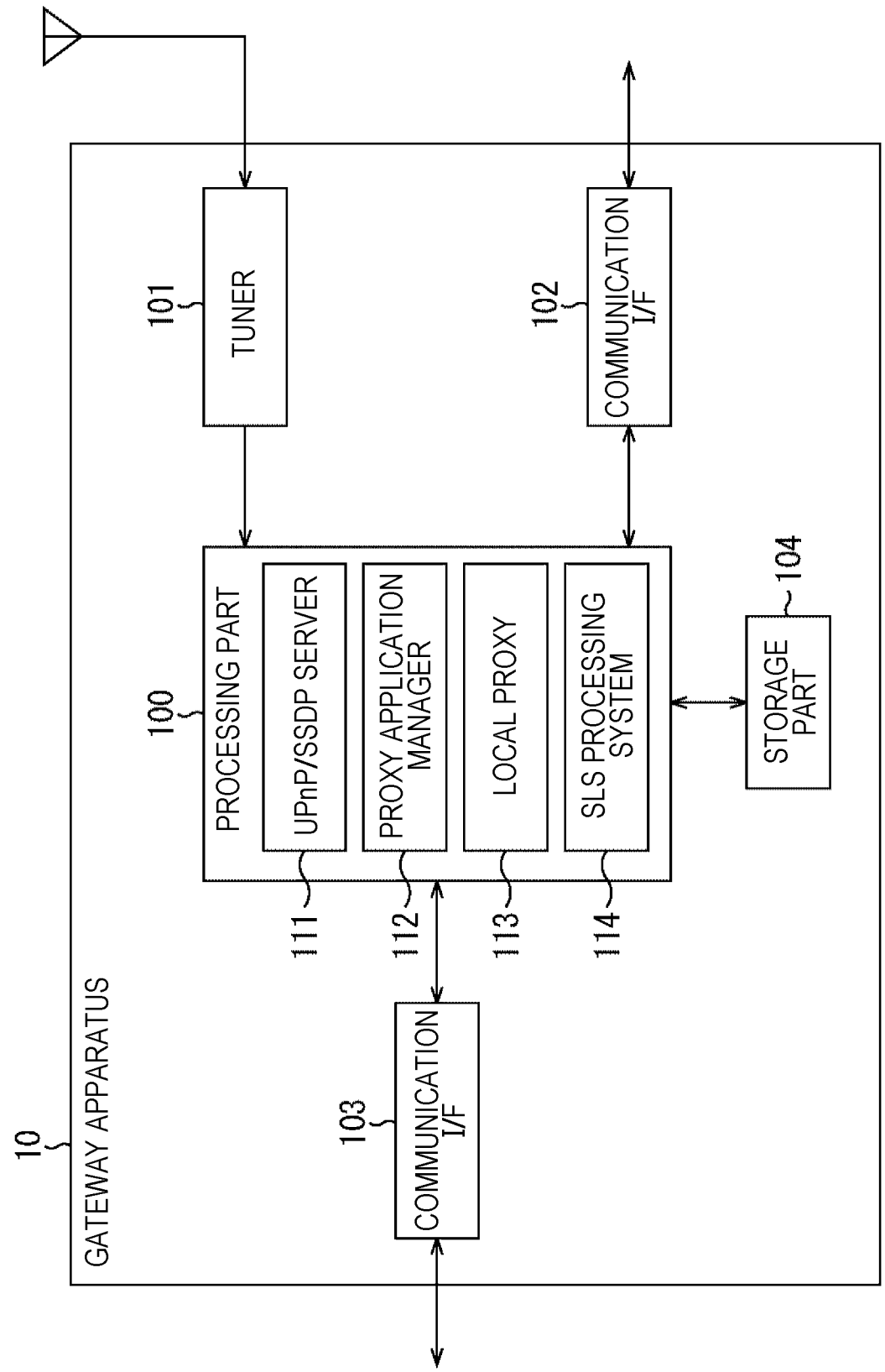
FIG. 2 is a diagram illustrating an exemplary configuration of a gateway apparatus.

FIG. 2 is a diagram illustrating an exemplary configuration of the gateway apparatus 10 of FIG. 1.

In FIG. 2, the gateway apparatus 10 is configured of a processing part 100, a tuner 101, a communication I/F 102, a communication I/F 103, and a storage part 104.

The processing part 100 is configured of a central processing unit (CPU), a microprocessor, or the like, for example. The processing part 100 performs processings such as various computation processings or operation control of each part.

The tuner 101 performs a necessary processing (such as demodulation processing) on a broadcasting wave received via an antenna, and supplies the resultant multiplexed stream to the processing part 100. The processing part 100 processes the multiplexed stream supplied from the tuner 101, and supplies the resultant data to the communication I/F 103.

The communication I/F 102 requests the communication server 70 connected to the Internet 80 to distribute content under control of the processing part 100. The communication I/F 102 receives a stream of content distributed from the communication server 70 via the Internet 80, and supplies it to the processing part 100. The processing part 100 processes the stream of content supplied from the communication I/F 102, and supplies the resultant data to the communication I/F 103.

The communication I/F 103 receives data transmitted from the client apparatus 20 connected to the network 30, and supplies it to the processing part 100. Further, the communication I/F 103 transmits data supplied from the processing part 100 to the client apparatus 20 via the network 30.

Additionally, the communication I/F 102 and the communication I/F 103 are configured of a communication interface circuit or the like, for example. Further, the gateway apparatus 10 of FIG. 2 is described assuming that the communication I/F 102 and the communication I/F 103 are in different blocks for convenient description, but the communication I/F 102 and the communication I/F 103 may be assumed as one common communication I/F.

The storage part 104 is configured of a semiconductor memory, a hard disk drive (HDD), or the like, for example. The storage part 104 stores various items of data under control of the processing part 100.

The processing part 100 includes a UPnP/SSDP server 111, a proxy application manager 112, a local proxy 113, and an SLS processing system 114.

The UPnP/SSDP server 111 and the proxy application manager 112 are services operating in the gateway apparatus 10, and perform a processing of establishing connection between the client apparatus 20 connected to the network 30 and the local proxy 113.

Additionally, the processings performed in the UPnP/SSDP server 111 and the proxy application manager 112 will be described below in detail with reference to FIG. 17 and FIG. 18. Further, the UPnP/SSDP server 111 can have a web server (local web server) function.

The local proxy 113 is a service operating in the gateway apparatus 10, and transmits a request from the client apparatus 20 connected to the network 30 to the communication server 70 connected to the Internet 80. Further, the local proxy 113 receives a stream of content from the communication server 70 via the Internet 80, and transmits (transfers) it to the client apparatus 20 connected to the network 30.

Additionally, the local proxy 113 performs an extension header insertion processing on the request from the client apparatus 20, and the processing will be described below in detail with reference to FIG. 17, FIG. 18, FIG. 27, and the like.

The SLS processing system 114 performs processings for service layer signaling (SLS) as control information acquired via broadcasting or communication. Additionally, SLS will be described below in detail with reference to FIG. 6. Further, the processings performed in the SLS processing system 114 will be described below in detail with reference to FIG. 27.

The gateway apparatus 10 is configured as described above.

(Configuration of Client Apparatus)

Figure 3:
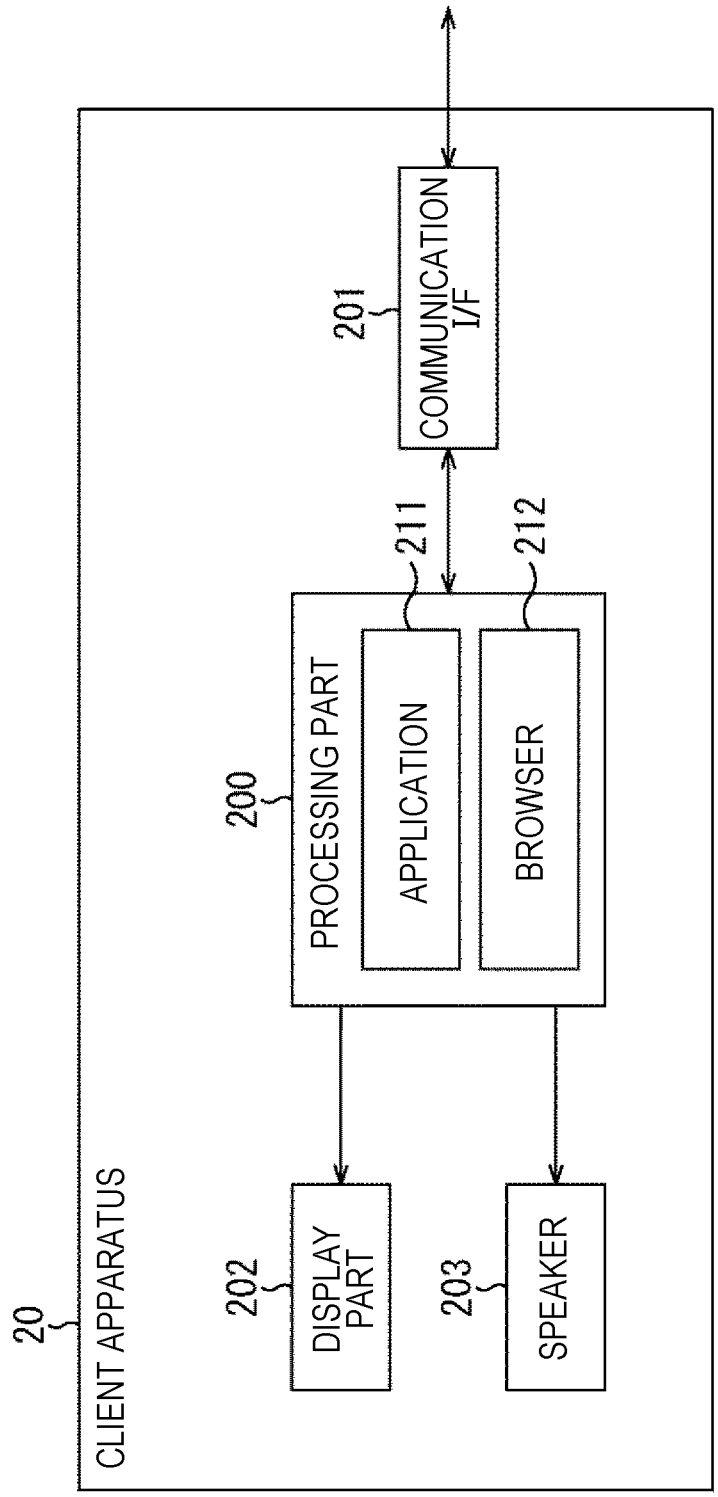
FIG. 3 is a diagram illustrating an exemplary configuration of a client apparatus.

FIG. 3 is a diagram illustrating an exemplary configuration of the client apparatus 20 of FIG. 1.

In FIG. 3, the client apparatus 20 is configured of a processing part 200, a communication I/F 201, a display part 202, and a speaker 203.

The processing part 200 is configured of a CPU, a microprocessor, or the like, for example. The processing part 200 performs processings such as various computation processings or operation control of each part.

The communication I/F 201 is configured of a communication interface circuit or the like, for example.

The communication I/F 201 requests the gateway apparatus 10 connected to the network 30 to distribute content under control of the processing part 200. Further, the communication I/F 201 receives content data transmitted (transferred) from the gateway apparatus 10 via the network 30, and supplies it to the processing part 200.

The processing part 200 processes the content data supplied from the communication I/F 201, supplies video data to the display part 202, and supplies audio data to the speaker 203 in the resultant data.

The display part 202 is configured of a display such as liquid crystal display (LCD), organic electroluminescence display (OELD), or the like. The display part 202 displays a video corresponding to the video data supplied from the processing part 200. The speaker 203 outputs audio corresponding to the audio data supplied from the processing part 200.

Additionally, in a case where the display part 202 has a touch panel function, an operation signal in response to an operation of the end user on the touch panel is supplied to the processing part 200, and the processing part 200 performs a processing according to the operation signal. Further, though not illustrated in FIG. 3, an input part such as physical button may be provided and an operation signal in response to an operation of the end user on the input part may be supplied to the processing part 200.

The processing part 200 includes an application 211 and a browser 212. The application 211 and the browser 212 provide a renderer function.

The application 211 performs a processing of establishing connection between the client apparatus 20 connected to the network 30 and the local proxy 113 operating in the gateway apparatus 10. Additionally, the processings performed in the application 211 will be described below in detail with reference to FIG. 17 and FIG. 18.

The browser 212 processes date which is the content data supplied from the communication I/F 201 and is received via broadcasting or communication by the gateway apparatus 10, and reproduces the content.

Additionally, the browser 212 functions as a DASH player, which will be described below in detail with reference to FIG. 6. Further, the processings performed in the browser 212 will be described below in detail with reference to FIG. 17, FIG. 18, FIG. 27, and the like.

The client apparatus 20 is configured as described above.
(Exemplary Implementation of Reception-Side Apparatuses)

The description has been made assuming that in the transmission system 1 of FIG. 1, the gateway apparatus 10 plays a role in transferring data distributed from a transmission-side server via broadcasting or communication to the reception-side client apparatus 20, but any of the client apparatuses 20 connected to the network 30 may be in charge of the role.

It is assumed herein that the client apparatus 20-1 among a plurality of client apparatuses 20 connected to the network 30 in the end user's home 2 has the similar functions as the gateway apparatus 10 such as tuner and communication I/F, and can receive broadcasting- or communication-distributed content data, for example.

In this case, the client apparatuses 20-2 to 20-N can receive content data broadcasting- or communication-distributed via the client apparatus 20-1 operating as a gateway. Also in this case, however, the client apparatuses 20-2 to 20-N may be connected to the gateway apparatus 10 and may receive broadcasting- or communication-distributed content data.

Figure 4:
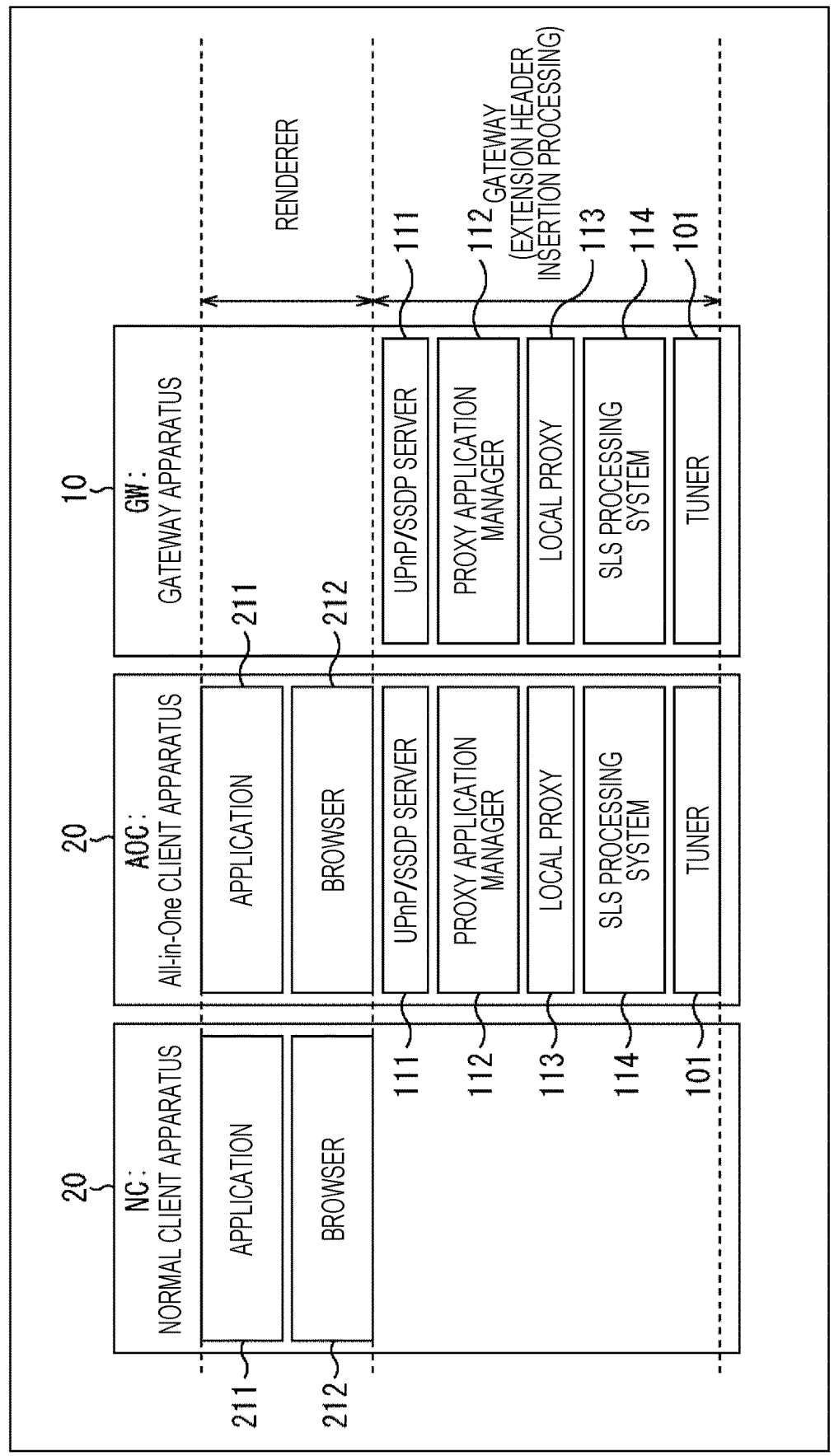
FIG. 4 is a diagram for explaining an exemplary implementation of reception-side apparatuses.

The relationships are summarized as in FIG. 4. That is, in FIG. 4, the gateway apparatus 10 includes, as the processing part 100, the UPnP/SSDP server 111, the proxy application manager 112, the local proxy 113, and the SLS processing system 114 together with the tuner 101, as illustrated in the configuration of FIG. 2.

Further, in FIG. 4, the client apparatuses 20 include two kinds of client apparatuses of normal client apparatuses 20 having only the renderer function, and all-in-one client apparatuses 20 having not only the renderer function but also the gateway function.

Additionally, in the following description, an all-in-one client apparatus 20 will be also referred to as "all-in-one client (AOC)" and a normal client apparatus 20 will be also referred to as "normal client (NC)" as needed. Further, the gateway apparatus 10 will be also referred to as "gateway (GW)."

The normal client apparatus (NC) 20 includes the renderer function by the application 211 and the browser 212 as illustrated in the configuration of FIG. 3. On the other hand, the all-in-one client apparatus (AOC) 20 includes the gateway function by the tuner 101, the UPnP/SSDP server 111, the proxy application manager 112, the local proxy 113, and the SLS processing system 114 similarly to the gateway apparatus (GW) 10 in addition to the renderer function.

That is, the normal client apparatus (NC) 20 exchanges data with a transmission-side server via the gateway apparatus (GW) 10 having the gateway function or the all-in-one client apparatus (AOC) 20, but the all-in-one client apparatus (AOC) 20 itself has the gateway function, and thus can exchange data with a transmission-side server all alone.

Figure 5:
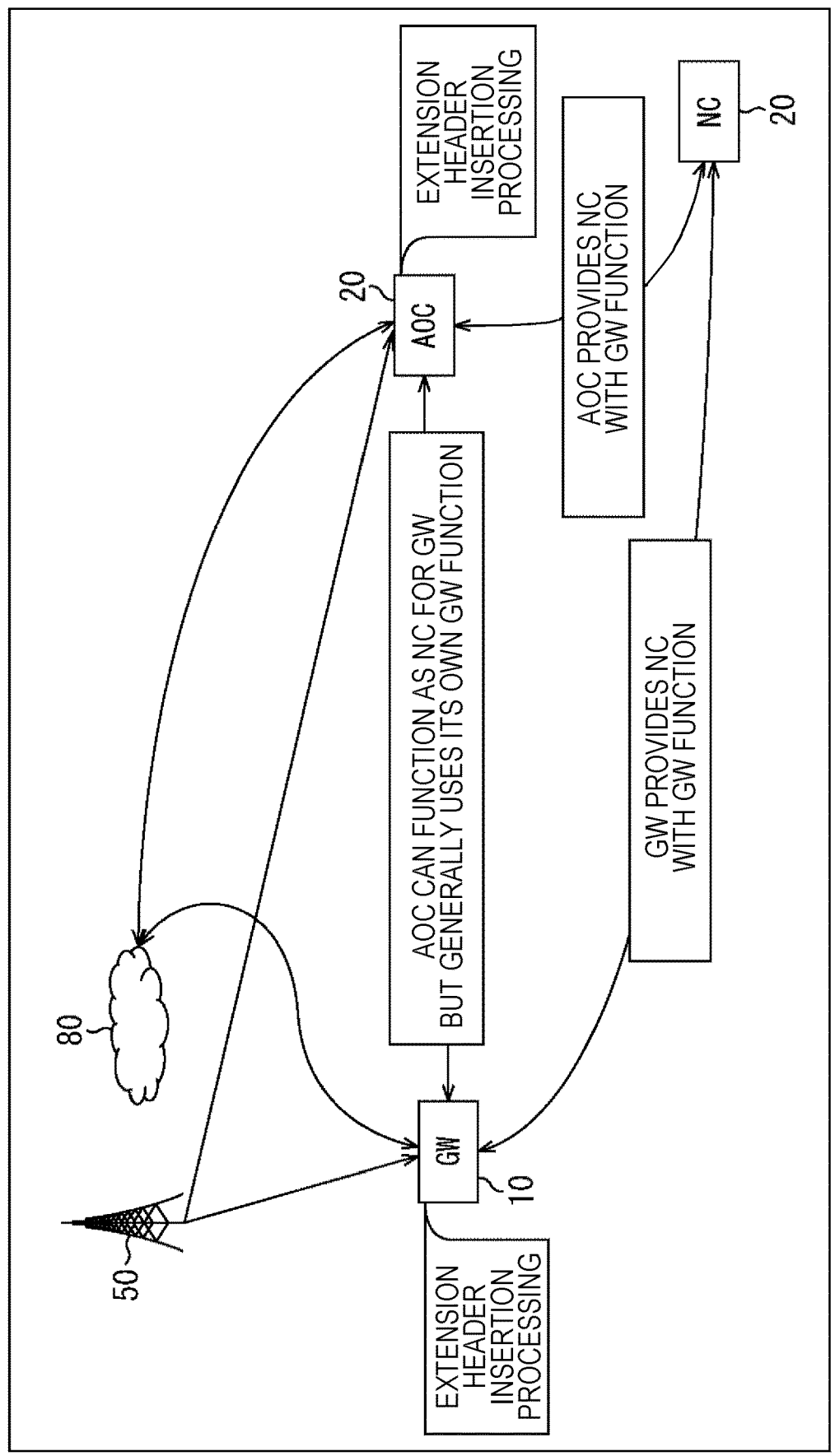
FIG. 5 is a diagram for explaining an exemplary implementation of reception-side apparatuses.

More specifically, the data exchange can be expressed as a relationship illustrated in FIG. 5.

In FIG. 5, the normal client apparatus (NC) 20 receives data through broadcasting or communication via the gateway apparatus (GW) 10 or the all-in-one client apparatus (AOC) 20. That is, the gateway apparatus (GW) 10 can provide the normal client apparatus (NC) 20 with the gateway function. Further, the all-in-one client apparatus (AOC) 20 can provide the normal client apparatus (NC) 20 with the gateway function.

Further, the all-in-one client apparatus (AOC) 20 is provided with the gateway function by the gateway apparatus (GW) 10, and can function as a normal client apparatus (NC) 20, but generally receives data via broadcasting or communication by use of its own gateway function.

The gateway apparatus (GW) 10 functions as a gateway, and transmits data broadcasting- or communication-distributed from a transmission-side server to the normal client apparatus (NC) 20 or the all-in-one client apparatus (AOC) 20. Further, the gateway apparatus (GW) 10 performs the extension header insertion processing on a request from the normal client apparatus (NC) 20 or the all-in-one client apparatus (AOC) 20, and transmits the resultant request via communication.

The all-in-one client apparatus (AOC) 20 functions as a gateway, and processes data broadcasting- or communication-distributed from a transmission-side server by itself or transmits it to the normal client apparatus (NC) 20. Further, the all-in-one client apparatus (AOC) 20 performs the extension header insertion processing on its processed request, or a request from the normal client apparatus (NC) 20, and transmits the resultant request via communication.

Additionally, for an apparatus having the gateway function of relaying data from a transmission-side server to the reception-side client apparatus 20, the same apparatus may process data via broadcasting and communication, or an apparatus configured to process data via broadcasting may be different from an apparatus configured to process data via communication. For example, data via broadcasting to the normal client apparatus (NC) 20 can be processed by the gateway apparatus (GW) 10, and data via communication can be processed by the all-in-one client apparatus (AOC) 20.

(Protocol Stack of Present Technology)

Figure 6:
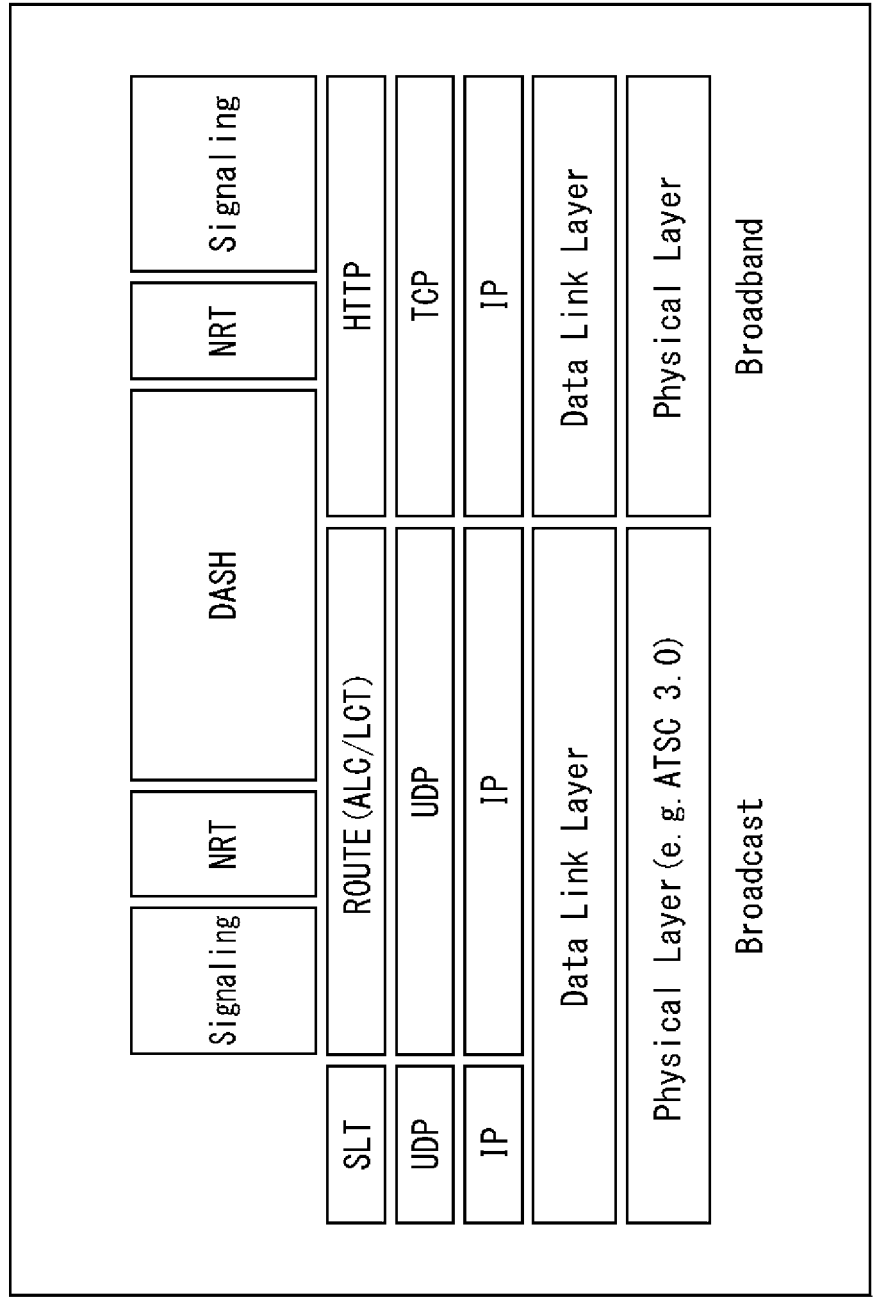
FIG. 6 is a diagram illustrating an exemplary protocol stack in an IP transmission system according to the present technology.

FIG. 6 is a diagram illustrating an exemplary protocol stack in an IP transmission system according to the present technology.

The MPEG2-Transport Stream (TS) system is widely used as a transmission system for digital broadcasting at present, but it is assumed that an IP transmission system using Internet protocol (IP) packets used in the field of communication for digital broadcasting is widely used in the future.

For example, it is expected that an IP transmission system is employed to provide more sophisticated services also in advanced television systems committee (ATSC)3.0 as one of the next-generation terrestrial broadcasting standards. Also in the present technology, an IP transmission system can be employed similarly to ATSC3.0 and the like.

In FIG. 6, the lowermost hierarchy is assumed as a physical layer. In digital broadcasting of an IP transmission system such as ATSC3.0, part of data may be transmitted by use of bidirectional communication, not limited to unidirectional broadcasting, but the physical layer corresponds to a frequency band or the like of a broadcasting wave assigned for a service (channel) in a case where broadcasting is used.

A higher hierarchy on the physical layer is assumed as a data link layer. Further, a higher hierarchy on the data link layer is assumed as an Internet protocol (IP) layer and a user datagram protocol (UDP) layer. The IP layer and the UDP layer correspond to a network layer and a transport layer in a hierarchy model for communication, and an IP packet and a UDP packet are specified by an IP address and a port number.

It is assumed herein that low level signaling (LLS) and service layer signaling (SLS) are used as control information (signaling) in ATSC3.0. LLS is control information transmitted in a lower layer than SLS. SLS is control information in units of service. That is, control information of the transport layer is transmitted in two hierarchies of LLS and SLS in ATSC3.0.

LLS includes metadata such as service list table (SLT). SLT metadata includes basic information indicating a configuration of a stream or service in a broadcasting network, such as information required for selecting a service (channel). The SLT metadata is included in a UDP/IP packet as an IP packet including a UDP packet to be transmitted. However, the UDP/IP packet storing the SLT metadata is transmitted with a special IP address and port number.

A higher hierarchy adjacent to the IP layer and the UDP layer is assumed as real-time object delivery over unidirectional transport (ROUTE). ROUTE is a streaming file transfer protocol, and is an extended file delivery over unidirectional transport (FLUTE).

With the ROUTE session, an SLS file (signaling), a non realtime (NRT) content file (NRT), a DASH segment file (DASH), and the like are transmitted in accordance with service.

Here, SLS is control information indicating a service level, and provides information, attributes, or the like required for searching and selecting a component belonging to a target service. SLS includes metadata such as user service bundle description (USBD), service-based transport session instance description (S-TSID), and media presentation description (MPD).

USBD metadata includes information indicating acquisition source of other metadata and the like. Additionally, the USBD metadata will be described below in detail with reference to FIG. 14.

S-TSID metadata is extended LCT session instance description (LSID) for ATSC3.0, and is control information of the ROUTE protocol. Further, the S-TSID metadata can specify extended FDT (EFDT) transmitted in the ROUTE session. EFDT is extended file delivery table (FDT) introduced in FLUTE, and is control information for transfer.

MPD metadata is control information of video or audio files used to stream on the basis of MPEG-DASH. Additionally, the MPD metadata will be described below in detail with reference to FIG. 7 to FIG. 11, FIG. 14, and the like.

Here, MPEG-DASH is a streaming standard according to over the top video (OTT-V), and is a standard for adaptive streaming using a streaming protocol based on hypertext transfer protocol (HTTP).

A manifest file for describing metadata as control information indicating a video or audio file, and a file format for transmitting moving picture content are defined in the MPEG-DASH standard. Here, the former manifest file is referred to as media presentation description (MPD), and the latter file format is referred to as segment format.

Further, in a case where ROUTE is used as a transport protocol, an MP4 file format can be used as a streaming file format. The MP4 file format is derived from ISO base media file format (ISO BMFF) defined in ISO/IEC 14496-12.

Segments transmitted in the ROUTE session are configured of an initialization segment (IS) and a media segment (MS) The initialization segment includes initialization information such as data compression system. Further, the media segment stores data indicating video, audio, and subtitle streams. That is, the media segment corresponds to the DASH segment (DASH segment file).

In this way, stream data of a service component (such as video, audio, or subtitle) configuring content of a program or the like is transmitted in the ROUTE session in units of DASH segment conforming to the ISO BMFF standard.

Additionally, NRT content are temporarily accumulated in a storage in a receiver and then reproduced. Further, files other than the NRT content (such as applications or electronic service guide (ESG) files) may be transmitted in the ROUTE session.

Further, SLT metadata for LLS, or metadata such as USBD, S-TSID, or MPD for SLS can be data in a text format described in a markup language such as extensible markup language (XML), for example.

On the other hand, in a case where bidirectional communication (broadband) is used, a higher hierarchy on the physical layer is assumed as a data link layer. Further, a higher hierarchy on the data link layer is assumed as an IP layer corresponding to the network layer. A hierarchy adjacent to the IP layer is assumed as a transmission control protocol (TCP) layer corresponding to the transport layer, and further a hierarchy adjacent to the TCP layer is assumed as an HTTP layer corresponding to the application layer.

That is, a protocol such as TCP/IP operating in a communication line such as the Internet 80 of FIG. 1 is implemented by the hierarchies.

Some hierarchies among the hierarchies adjacent to the HTTP layer are assumed as control information (signaling) and NRT content (NRT). The control information includes all the control information such as the control information transmitted in the ROUTE session. Further, the NRT content are acquired via communication, and include an application, for example.

The other hierarchy other than the above hierarchies among the hierarchies adjacent to the HTTP layer is assumed as a DASH segment (DASH). That is, in bidirectional communication-based streaming, stream data of a service component (such as video, audio, or subtitle) configuring content of video on demand (VOD) program or the like is transmitted in units of DASH segment conforming to the ISO BMFF standard.

As described above, in the protocol stack in the IP transmission system according to the present technology, part of the unidirectional broadcasting-based hierarchies and part of the bidirectional communication-based hierarchies serve as a common protocol, and can transmit stream data of a service component configuring content in units of DASH segment conforming to the ISO BMFF standard in unidirectional broadcasting and bidirectional communication.

Thus, in a case where both unidirectional broadcasting-based streaming and bidirectional communication-based streaming are performed, the protocols of the higher hierarchies are common, thereby reducing loads on implementation or loads on processings in the client apparatuses 20, the broadcasting server 40, or the communication server 70, for example.

(Details of MPD Metadata)

MPD metadata transmitted as SLS will be described below in detail with reference to FIG. 7 to FIG. 11.

MPD metadata describes Period elements, AdaptationSet elements, and Representation elements in a hierarchical structure.

Figure 7:
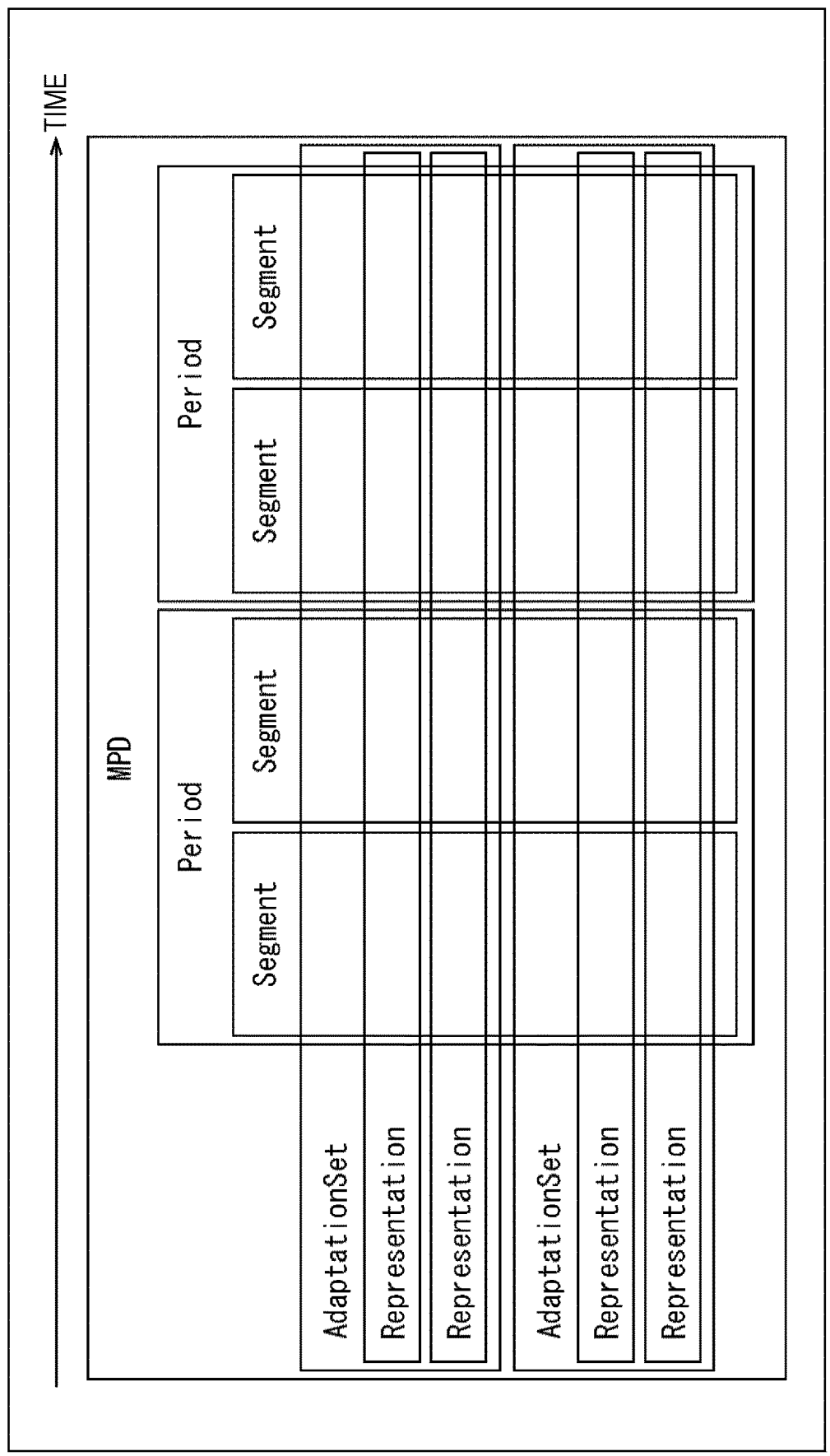
FIG. 7 is a diagram for explaining detailed MPD metadata.

For example, as illustrated in FIG. 7, the Period elements indicating a punctuated time are present under the MPD element as a route element, the AdaptationSet elements are arranged for streams (elementary streams) of video, audio, subtitle, and the like under the Period elements, attributes of the respective streams are described.

Further, the Representation elements are divided for a plurality of streams with different attributes such as rate, which derive from the same stream (elementary stream), under the AdaptationSet elements, and the respective attributes such as rate are described. Additionally, the Representation elements are divided into a plurality of segments on the time axis.

The client apparatus 20 purses MPD metadata transmitted as SLS, and can select an optimum stream depending on a network environment of the client apparatus 20 with reference to the rate values designated for the streams described in the Representation elements.

Figure 8:
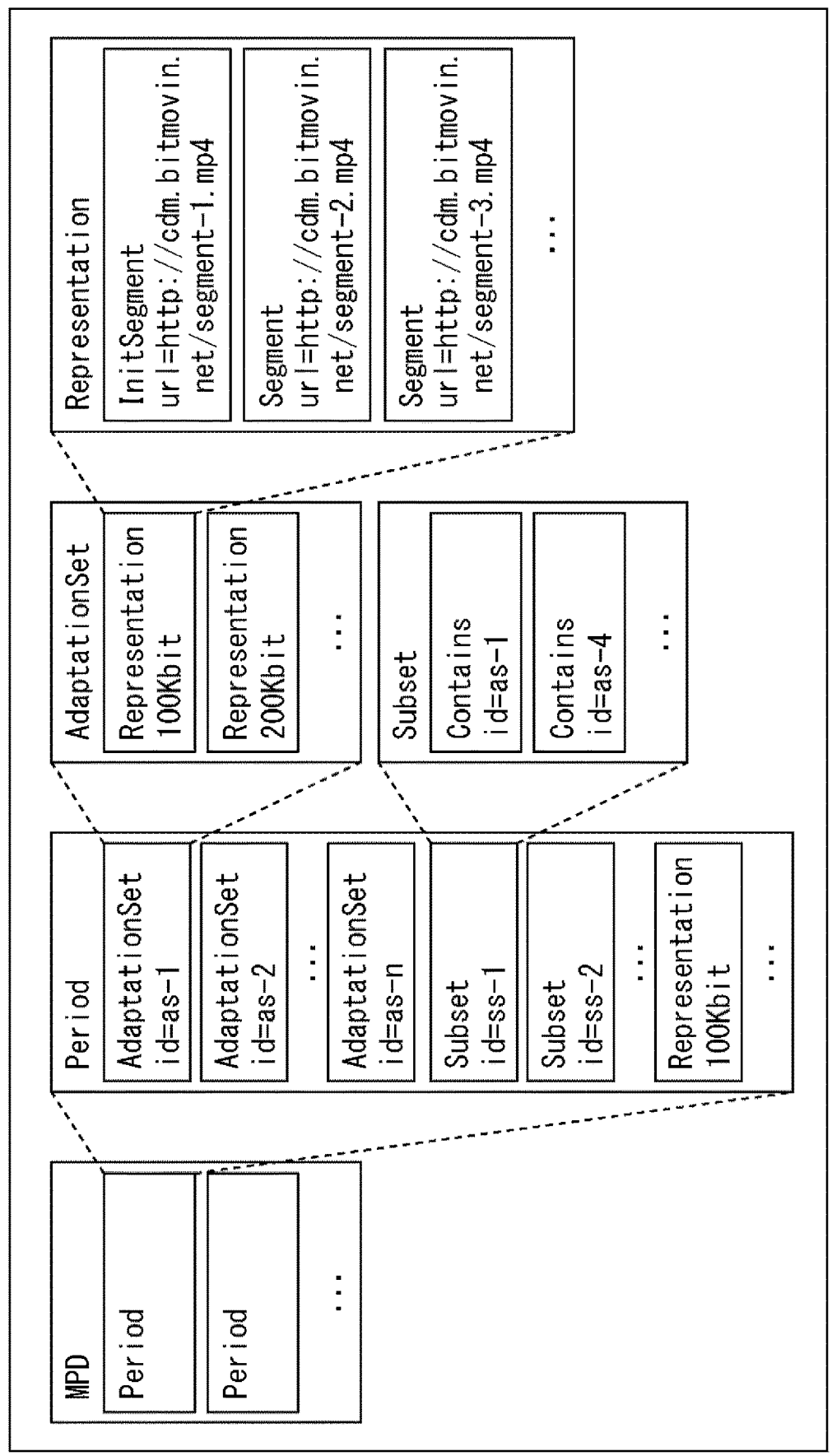
FIG. 8 is a diagram for explaining detailed MPD metadata.

FIG. 8 illustrates a relationship among the Period element, the AdaptationSet element, and the Representation element in the MPD metadata in detail.

Additionally, in a case where the Representation element is configured of a further plurality of streams, SubRepresentation elements for describing attributes of each stream can be arranged under the Representation element.

Here, a segment file described in the MPD metadata is specified by URL (byte range). A segment is part of the Representation element, and one Representation element is configured of any of the following.

(1) One or more segment lists
(2) One segment template
(3) One or more base URLs and up to one segment base (in this case, neither segment list nor segment template is present).

Exemplary descriptions of MPD metadata corresponding to the above (1) to (3) will be described below.

FIG. 9 is a diagram illustrating exemplary MPD metadata in a case where SegmentBase is used.

As illustrated in FIG. 9, SegmentBase is used in a case where only one media segment (segment) is present for one Representation element. In FIG. 9, a byte string of initialization information and a byte string of random access points (RAP) are within the first 834 bytes of the file. Additionally, the 834 bytes are described by the indexRange attribute of the SegmentBase element.

FIG. 10 is a diagram illustrating exemplary MPD metadata in a case where SegmentList is used.

As illustrated in FIG. 10, SegmentList is used in a case where a plurality of segment URLs are arranged for one Representation element. A plurality of SegmentURL elements arranged in order of reproduction are described in the SegmentList element in the Representation element of FIG. 10.

The SegmentURL element is expressed by URL of the DASH segment file (byte range in the file). Additionally, a file (InitSegment) storing the initialization information is designated for the Initialization element arranged at the head of the SegmentList element.

FIG. 11 is a diagram illustrating exemplary MPD metadata in a case where SegmentTemplate is used.

As illustrated in FIG. 11, SegmentTemplate is used to automatically generate a segment URL. Live streaming is a typical example of the use case. That is, in segmentTemplate, special parameters in the template of the segment URL described in the SegmentTemplate element are dynamically rearranged thereby to generate a perfect list of segment URLs.

Specifically, the part "$Number$" in the URL described as an attribute value of the media attribute of the SegmentTemplate element corresponds to Replacement Parameter, and the parameter is rewritten from the value of the startNumber attribute while being sequentially incremented, thereby generating a segment URL. Additionally, the segmentTemplate is used thereby to remarkably reduce the size of the MPD metadata.

<2. Outline of Present Technology>

Incidentally, it is assumed that the transmission system 1 is operated such that the access statistics (viewing rate) is managed on the basis of a history of HTTP requests for certain content by the client apparatus 20 in a server (such as the communication server 70) managed on content distribution side (broadcaster). Additionally, the content data is transmitted in a chunked file sequence or fragment sequence generated from one content, such as DASH segment file sequence.

In a case where such an operation is performed, if a correlation between requests is difficult to know when an HTTP request for each chunked DASH segment is recorded, it is difficult to determine whether the request sequences are for the same content.

On the other hand, the contents of a request URL described in the request header of the HTTP request (referred to as HTTP request header below) are analyzed to specify the same pattern, thereby associating (coordinating) HTTP request sequences.

However, in a case where a correlation between URL contents is easy to know, the method can be applied, but even if a DASH segment file is generated from the same content data, a segment URL (segmentUrl) included in MPD metadata can have totally uncorrelated contents depending on a method for configuring an AdaptationSet element or Representation element described in the MPD metadata.

FIG. 12 illustrates exemplary MPD metadata describing such a configuration. A period element, an AdaptationSet element, and a Representation element make a hierarchical structure in the MPD metadata of FIG. 12, and a plurality of segment URLs are described as a segment list in the Representation element.

For the segment URLs, a base URL designated as a value of the BaseURL element and a file URL designated as a value of the media attribute of the SegmentURL element are combined thereby to obtain a complete URL.

That is, in the MPD metadata of FIG. 12, two sequences of Representation element generated by the same content are described, where one sequence is "http://cdn1.com/seg-201.mp4," "http://cdn1.com/seg-202/mp4," . . . , and the other sequence is "http://cdn2.com/s101/.mp4," "http://cdn2.com/s102.mp4," . . . .

Additionally, the example indicates that the same content are distributed from different content delivery network (CDN) servers in different distribution source paths by use of a CDN service.

Here, it is not easy to estimate that DASH segment sequences for the described two sequences of Representation element in FIG. 12 are sequences of DASH segment generated from the same content on the basis of a relationship between "http://cdn1.com/seg-201.mp4" and "http://cdn2.com/s101.mp4," or the like.

Further, if the contents of the request URLs have a correlation, the communication server 70 which receives an HTTP request always holds the previously-processed URL sequences, and compares with a request URL of a subsequent HTTP request, and needs to estimate and store that they are DASH segments generated from the same content if the contents have a correlation.

Additionally, the case where the contents of the request URLs have a correlation is a case where the sequences are arranged in time series and some parts therein are encoded as regular integers like "http://cdn1.com/seg-201.mp4," "http://cdn1.com/seg-202.mp4," . . . , for example.

However, in a case where such an operation is performed, a load for holding the history of past request URLs (status information) is heavier in the communication server 70, and an extra processing load for comparing request URLs or estimating possible content with the same source (identity of content source) is increased, for example, thereby losing scalability. Thus, it is not realistic for the communication server 70 to estimate the identity of content depending on only request URLs and to record the access statistics by use of the result.

On the other hand, for example, a broadcaster or the like for providing services requests to make the access statistics for DASH segment distributed in the ATSC3.0 broadcasting service (also referred to as ATSC3.0 service below) in the currently-discussed ATSC3.0 as follows.

That is, there is a request that an end user device (also referred to as ATSC3.0 end device below) which accesses with the ATSC3.0 service (broadcasting service) as a service entry is discriminated from an end user device (also referred to as normal end device below) which accesses with a general Internet site as a service entry and the access statistics for DASH segment is recorded by use of the logging function of an existing CDN.

Additionally, the ATSC3.0 end device herein can be both a normal client apparatus (NC) 20 and an all-in-one client apparatus (AOC) 20. Further, the normal end device can be both a normal client apparatus (NC) 20 and an all-in-one client apparatus (AOC) 20.

Further, the communication server 70 is provided as a CDN server so that when the communication server 70 distributes content data (DASH segment file), the access statistics for DASH segment can be recorded by use of the logging function an existing CDN. Here, additional cost can be minimized by use of the existing CDN function.

As described above, a business operator such as a broadcaster requests to discriminate the ATSC3.0 end device from the normal end device and to manage the access statistics, for example, but a technical system for meeting the request is not established at present.

Thus, according to the present technology, in a case where services using broadcasting and communication are served, the ATSC3.0 end device (client apparatus 20) which accesses via communication with the ATSC3.0 service (broadcasting service) as a service entry is made identifiable, thereby more flexibly serving services using broadcasting and communication.

That is, according to the present technology, in a case where an HTTP request for DASH segment is transmitted via communication with a broadcasting service as a service entry, identification information for identifying the identity of content source as a source of the DASH segment (referred to as source identification information below) is inserted into the HTTP request header.

For example, the same content may have different attributes such as rate or different distribution paths such as via broadcasting or via communication, and even in such a case, the same source identification information (identifier for identifying the source identity) is added for the same content sources, thereby identifying the source identity, for example.

Thereby, the communication server 70 has only to store the source identification information included in the HTTP request header and does not need to process the correlation between request URLs of HTTP requests for DASH segment due to distribution of different services for each HTTP request, thereby remarkably reducing the processing load on the communication server 70.

However, the processing of adding such a special header to an HTTP request cannot be easily added to the implementation of the normal DASH client (DASH player).

Thus, according to the present technology, all the HTTP requests for DASH segment distributed in the ATSC3.0 service (broadcasting service) are routed via an ATSC3.0 proxy server (the local proxy 113 operating in the gateway apparatus 10).

Thereby, an extension header (source identification information) can be easily inserted in the HTTP request header by a module, server-side script, or the like on the local proxy 113.

Further, the local proxy 113 is configured as a transparent proxy capable of transparently processing secure end-to-end transactions such as transport layer security (TLS) Thereby, the extension header insertion processing can be similarly performed also for request/response transactions of DASH segment protected (hidden) by a secure end-to-end transport session such as TLS.

Additionally, various technologies have been already proposed for technologies for transparent proxy, and the well-known technologies can be used herein.

<3. HTTP Request Header Extension Method>

(Exemplary Extension Header)

FIG. 13 is a diagram illustrating an exemplary extension header according to the present technology.

FIG. 13 illustrates an exemplary extension header description in the ATSC3.0 service as an exemplary HTTP request header extension.

In FIG. 13, the name of an extension header extended to a general header of the HTTP request header is assumed as "ATSC3.0-Requset," for example. Here, the general header indicates not an entity body of request or response buta header applied for connection. Additionally, the extension header name can be assumed as "X-ATSC3.0-Requset" in a case where the extension header name is defined as a private header.

The source identification information for identifying the identity of a content source is arranged as a value of the extension header. The source identification information can include main attributes associated with ATSC3.0 service distribution such as service ID (service-id), content ID (contentId), URL of MPD metadata (mpd-uri), and time information (broadcastTime).

Service ID is an ID (global service ID) for identifying a service defined in ATSC3.0. The service ID is assumed as an essential value.

Additionally, the details of service ID (globalServiceId) defined in ATSC3.0 is disclosed in "Table 7.1 Semantics of the User Service Bundle Description Fragment for ROUTE/ DASH" in Non-Patent Document 1 described below.

That is, a value of the globalServiceID attribute of the userServiceDescription element in the USBD metadata can be used as a service ID.

Non-Patent Document 1: ATSC Candidate Standard: Signaling, Delivery, Synchronization, and Error Protection (A/331) Doc. 533-174r15 Jan. 2016

URL of MPD metadata is uniform resource locator (URI) indicating an absolute path of the MPD metadata referred to by the USBD metadata. The URL is assumed as an optional value.

Additionally, a value of the fullMPDUri attribute of the userServiceDescription element in the USBD metadata as disclosed in "Table 7.1 Semantics of the User Service Bundle Description Fragment for ROUTE/DASH" in Non-Patent Document 1 described above can be used as URL of MPD metadata.

Time information indicates when content are actually broadcasted. However, selection of broadcasting time contents is implementation-dependent. That is, for example, whether the broadcasting time is the start time of a content distribution schedule or any time between the start and the end of a distribution schedule (when a packet of an HTTP request arrives) is set depending on an operation. The time information is assumed as an optional value.

Content ID is an ID for identifying content. The content ID can designate "EIDR" or "Ad-ID," for example. Here, "EIDR" stands for Entertainment Identifier Registry, and can manage the content of TV programs or movies by a single global ID. "Ad-ID" stands for Advertising ID, and is an ID for advertising. The content ID is assumed as an optional value.

Figure 14:
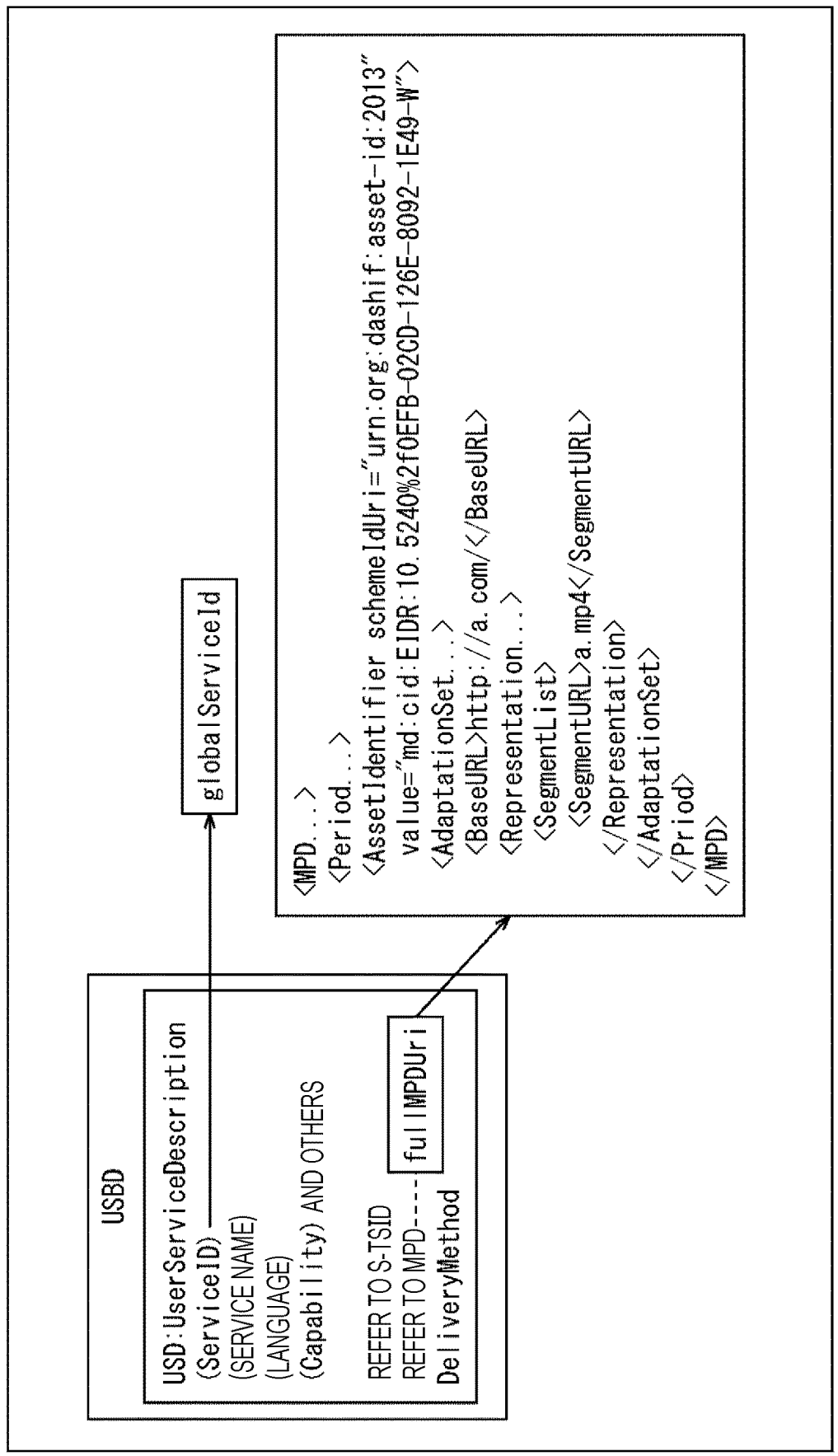
FIG. 14 is a diagram illustrating exemplary identification information inserted as an extension header.

Here, FIG. 14 illustrates exemplary source identification information inserted as an extension header into an HTTP request.

That is, FIG. 14 illustrates exemplary descriptions of XML-format USBD metadata and MPD metadata, but the information acquired from the metadata can be included as attributes associated with the ATSC3.0 service distribution in the source identification information.

For example, for the USBD metadata, service ID (global service ID) is acquired from the value of the globalServiceID attribute of the userServiceDescription element and URL of MPD metadata is acquired from the value of the fullMPDUri attribute of the userServiceDescription element. Further, for example, content ID corresponding to EIDR is acquired from the value of the AssetIdentifier element of the Period element for the MPD metadata.

Additionally, though described in detail below, a mapping database storing the source identification information is previously generated prior to the extension header insertion processing so that the source identification information to be inserted into an HTTP request can be acquired with reference to the mapping database in the extension header insertion processing.

Further, URL described in the DeliveryMethod element in the USBD metadata is matched with URL (segment URL) described in the Representation element in the MPD metadata, thereby specifying whether a content data (stream) distribution path is via broadcasting or via communication. Additionally, description and derivation of a segment URL in MPD metadata are as described above with reference to FIG. 7 to FIG. 11.

A specific example of an HTTP request header will be described below with reference to FIG. 15 and FIG. 16. Here, an HTTP request header before extension header insertion will be first described with reference to FIG. 15, and then the HTTP request header after extension header insertion will be described with reference to FIG. 16.

(Http Request)

Figure 15:
FIG. 15 is a diagram illustrating an exemplary HTTP request.

FIG. 15 is a diagram illustrating an exemplary HTTP request.

FIG. 15 illustrates an exemplary HTTP request for acquiring a DASH segment file in a case where the segment URL is "http://a.com/a.mp4."

The HTTP request uses the GET method among the methods defined in HTTP. The host name (server name) is designated by HOST and the resource is designated by the GET method in the HTTP request. Additionally, "HTTP/ 1.1" indicates an HTTP version.

Additionally, in the HTTP request, the first row is an HTTP request row, and the second and subsequent rows are HTTP header rows or HTTP request header. Further, in a case where the GET method is used, nothing is described in the HTTP body part.

(HTTP Request after Extension Header Insertion)

FIG. 16 is a diagram illustrating an exemplary HTTP request inserted with an extension header.

In FIG. 16, a row of the extension header name "atsc3.0-request" is added as an extension header to the HTTP request (HTTP request header) of FIG. 15.

That is, the attributes of the content of the DASH segment file added as the extension header is configured of the source identification information acquired by referring to the mapping database with the segment URL as a main key. Specifically, the source identification information such as service ID, content ID, URL of MPD metadata, and time information is added as an extension header.

For example, in the HTTP request extension header of FIG. 16, "urn:atsc:serviceId:NBCU-NFL-1" as a value of the globalServiceID attribute of the USBD metadata is designated as service ID (service-id), and "http://a.com/ a.mpd" as a value of the fullMPDUri attribute of the USBD metadata is designated as URL (mpd-uri) of the MPD metadata.

Further, in the HTTP request extension header of FIG. 16, "md:cid:EIDR:10.5240%2f0EFB-02CD-126E-8092-1E49-W" as EIDR described in the AssetIdentifier element of the MPD metadata is designated as content ID (contentId). Further, in the HTTP request extension header of FIG. 16, "Fri, 4 Jul. 2016 23:54:58 GMT" indicating a broadcasting time of the content, Jul. 4 (Fri), 2016 23:54:58 (Greenwich Mean Time) is designated as time information (broadcastTime).

As described above, according to the present technology, also in a case where the source identification information is inserted as an extension header into an HTTP request so that the HTTP request for DASH segment is transmitted via communication with a broadcasting service as a service entry, the identity of the content source can be identified.

Additionally, the description has been made herein by way of ATSC (particularly ATSC3.0) as a digital broadcasting standard employed in the U.S. and the like, but the present technology may be applied to integrated services digital broadcasting (ISDB) employed in Japan and the like or digital video broadcasting (DVB) or the like employed in European countries and the like.

That is, the source identification information is capable of identifying the identity of a content source, and is directed for identifying a broadcasting service (such as ATSC3.0 service or the like), and thus can be applied to various broadcasting systems. However, the above description demonstrates the source identification information such as service ID or content ID on the assumption of the ATSC3.0 service, but more appropriate information can be used in accordance with standard such as ISDB or DVB, not limited thereto.

Further, information defined in other than the digital broadcasting standards can be added to the source identification information as needed. For example, information defined in third generation partnership project (3GPP), which is a standardization project for mobile communication systems, can be added. Specifically, elements or attributes defined in 3GPP-multimedia broadcast multicast services (MBMS) can be added as source identification information, for example.

<4. Transparent Proxy Finding/Connection Method>

Incidentally, some methods are assumed for a method for finding/connecting (the local proxy 113 of) the gateway apparatus 10 which may be installed at a head end of a cable operator, a base station of a mobile network, or the like other than in the end user's home 2.

For example, there are a method for mutually inputting the IP address, port number, or the like of the local proxy 113 in the Internet connection setting menu of the browser 212 in the client apparatus 20, a method for registering the URL of a proxy setting script, an automatic setting method, and the like.

The automatic setting method may be a method using a dynamic host configuration protocol (DHCP) server, a method using web proxy auto discovery (WPAD), or the like, for example. Further, the automatic setting by proxy setting script may prepare a proxy autoconfiguration script file described in a script language such as JavaScript (registered trademark) and arranges the file on a web server, and further may set the URL of the file for the URL of the automatic setting script of the browser 212.

In a case where WPAD is used, the browser 212 itself automatically detects and downloads the position (URL) of the proxy setting script file thereby to perform the setting. Additionally, in WPAD, a method for searching an entry with the name "wpad" and downloading the proxy setting script therefrom is generally implemented by a method using a DHCPINFORM message of the DHCP server and a method using domain name system (DNS).

A similar method can be used also for finding (the local proxy 113 of) the gateway apparatus 10. In the local proxy 113, all the sessions including a secure end-to-end transport session by the HTTPS protocol can be mediated (stolen) by the local proxy 113. As described above, such a proxy is generally called transparent proxy.

The present technology proposes a system in which the client apparatus 20 finds the gateway apparatus 10 as a server where the local proxy 113 is operating in the network 30, and acquires the IP address and the port number (also referred to as proxy standby address/port) by which the local proxy 113 waits for a request.

Accordingly, the client apparatus 20 needs to recognize Web application programming interface (API) for inquiring the proxy standby address/port for the local proxy 113. That is, the Web API can be said as an interface for calling a service.

Here, in a case where universal plug and play (UPnP) is used for finding the local proxy 113 as a transparent proxy, simple service discovery protocol (SSDP) is used for finding the local proxy 113 and disclosing its functions.

Additionally, UPnP is a protocol enabling participation in a target network only by connecting a device. Further, SSDP is a protocol used for UPnP, and is directed for searching a device on a network and making a response.

An XML-format file describing the functions or information capable of being provided by a device is generally used as a device description exchanged in finding a service to be disclosed in SSDP. The file describes a device description describing a target device itself and a service description as an action of each service implemented on the target device.

According to the present technology, URL of Web API, which returns the IP address and the port number (proxy standby address/port) by which the local proxy 113 waits for a request, can be described in the description (such as service description) of the local proxy 113.

Further, according to the present technology, a protocol for finding a service of the local proxy 113 corresponding to a broadcasting service such as ATSC3.0 is added so that the normal client apparatus (NC) 20 not implementing a broadcasting service can set the proxy standby address/port as a proxy of the browser 212.

That is, there is configured such that when a script (Web API) is started in the browser 212 in the normal client apparatus (NC) 20 (normal end device such as a smartphone or tablet computer) not implementing a broadcasting service, the gateway apparatus 10 as a server corresponding to a broadcasting service can be found and the proxy standby address/port of the local proxy 113 operating therein can be set as a proxy of the browser 212.

The sequence of finding the local proxy 113 operating in the gateway apparatus 10 and acquiring the proxy standby address/port of the local proxy 113 (the proxy finding/connection processing) will be described below together with the above-described HTTP request header extension sequence (the extension header insertion processing).

Incidentally, SSDP has been described herein as a protocol for searching a device on a network and making a response by way of example, but similar functions can be realized by use of other protocol such as discovery and launch (DIAL). DIAL is a protocol for finding a device for DIAL on a network by UPnP and for activating a designated application.

<5. Flow of Proxy Finding/Connection Processing and Extension Header Insertion Processing>

(Proxy Finding/Connection Processing and Extension Header Insertion Processing)

A flow of the proxy finding/connection processing and the extension header insertion processing will be described with reference to the flowcharts of FIG. 17 and FIG. 18.

However, the description of FIG. 17 and FIG. 18 will be made with reference to the contents of a message such as request or response illustrated in FIG. 19 to FIG. 26 as needed.

Figure 17:
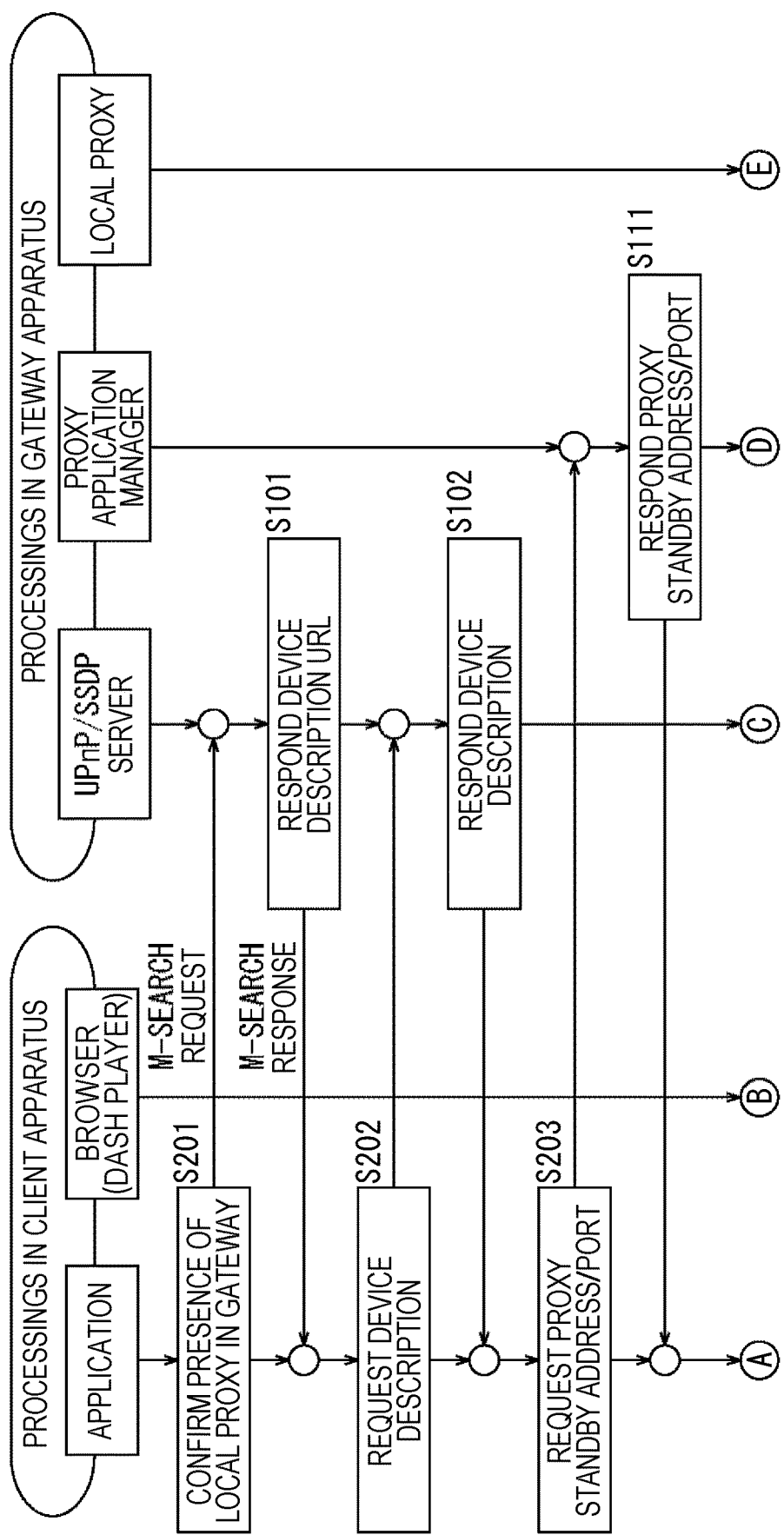
FIG. 17 is a flowchart for explaining a flow of a proxy finding/connection processing and an extension header insertion processing.
Figure 18:
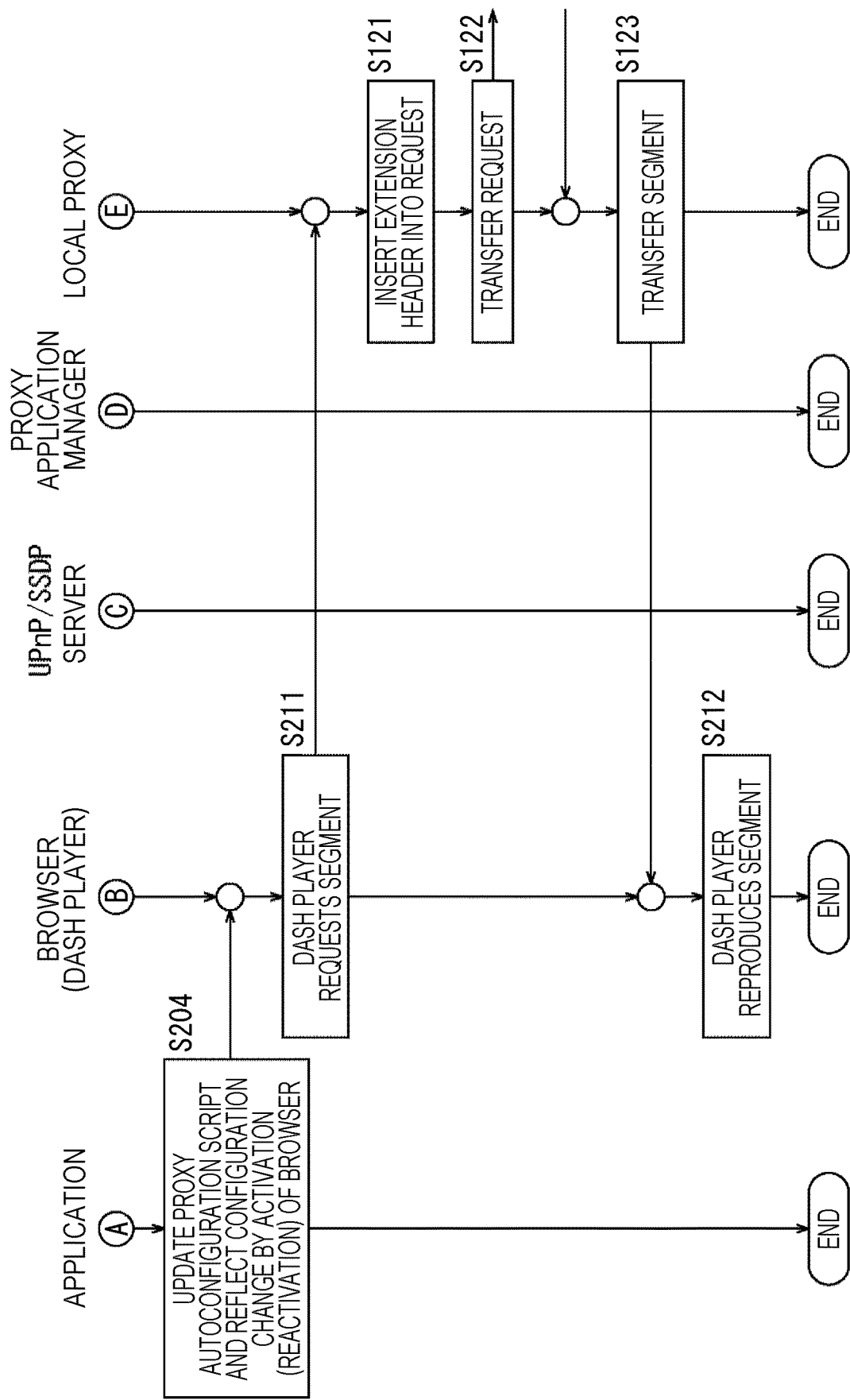
FIG. 18 is a flowchart for explaining a flow of the proxy finding/connection processing and the extension header insertion processing.

Further, the description of FIG. 17 and FIG. 18 assumes that the gateway apparatus 10 connected to the network 30 is assigned with an IP address "192.168.1.1." Further, it is assumed that the UPnP/SSDP server 111, the proxy application manager 112, and the local proxy 113 among the services operating in the gateway apparatus 10 are assigned with a port number "12345," a port number "23456," and a port number "34567," respectively.

Additionally, in FIG. 17 and FIG. 18, the processings in steps S101 to S102, the processing in step S111, and the processings in steps S121 to S123 are performed by the gateway apparatus 10. On the other hand, the processings in steps S201 to S204 and the processings in steps S211 and S212 are performed by the client apparatus 20.

In step S201 in FIG. 17, the application 211 multicast-transmits an M-SEARCH request to a device (server) connected to the network 30 via the communication I/F 201 in order to confirm the presence of the local proxy 113 operating in the gateway apparatus 10.

FIG. 19 is a diagram illustrating an exemplary M-SEARCH request.

A multicast IP address "239.255.255.250" and a port number "1900" are designated for the M-SEARCH request.

Further, as described above, SSDP is used as a UPnP protocol and "ssdp:discover" is designated for MAN. Further, the local proxy 113 as a proxy for ATSC3.0 is to be searched, and thus "urn:atsc:proxy" is designated for ST.

Returning to FIG. 17, in the processing in step S201, the M-SEARCH request transmitted by the client apparatus 20 is received by the gateway apparatus 10 connected to the network 30.

In step S101, the UPnP/SSDP server 111 generates a device description URL in response to the M-SEARCH request received from the client apparatus 20, and transmits it as an M-SEARCH response to the client apparatus 20 via the network 30.

FIG. 20 is a diagram illustrating an exemplary M-SEARCH response.

In the M-SEARCH response, a device description URL of "http://192.168.1.1:12345/deviceDescription.xml" is designated for LOCATION. The device description URL is URL of an XML-format file, and the file is processed by a local web server operating in the gateway apparatus 10.

That is, the UPnP/SSDP server 111 in the gateway apparatus 10 functions as a local web server, and thus the IP address "192.168.1.1" assigned to the gateway apparatus 10 and the port number "12345" assigned to the UPnP/SSDP server 111 as a local web server are described in the device description URL.

Returning to FIG. 17, in the processing in step S101, the M-SEARCH response transmitted by the gateway apparatus 10 is received by the client apparatus 20 which has transmitted the M-SEARCH request.

In step S202, the application 211 requests the device description to the UPnP/SSDP server 111 operating in the gateway apparatus 10 connected to the network 30 on the basis of (the device description URL of) the M-SEARCH response received from the gateway apparatus 10.

FIG. 21 is a diagram illustrating an exemplary device description request.

The device description "deviceDescripion.xml" is described as a target resource of the GET method for the device description request. Further, the host name "192.168.1.1:12345" is described for HOST.

That is, the target resource of the GET method is "deviceDescripion.xml" depending on the contents described in the M-SEARCH response in the device description request. Further, the IP address "192.168.1.1" of the gateway apparatus 10 and the port number "12345" of the UPnP/SSDP server 111 (local web server) are described as HOST in the device description request.

Returning to FIG. 17, in the processing in step S202, the device description request transmitted by the client apparatus 20 is received by the gateway apparatus 10 connected to the network 30.

In step S102, the UPnP/SSDP server 111 (local web server) generates a device description in response to the device description request received from the client apparatus 20, and transmits it as a response to the client apparatus 20 via the network 30.

FIG. 22 and FIG. 23 are diagrams illustrating an exemplary device description response.

A file type and the like are designated in the header of the device description response as illustrated in FIG. 22. Further, FIG. 23 illustrates the contents of the XML-format device description.

That is, "urn:schemas-upnp-org:device-1-0" as an xmlns attribute of the root element is described in the device description of FIG. 23, and the device description conforming to UPnP is declared.

A list of services supported by the gateway apparatus 10 is described in the serviceList element. One or more service elements are described in the serviceList element.

Information indicating one service among the supported services is described in the service element. The service element is a higher element such as the serviceType element, the serviceId element, the SCPDURL element, and the controlURL element.

The service type "urn:atsc:proxy" is described in the serviceType element, which indicates a proxy service of the ATSC3.0 service.

The service ID "urn:UPnP:serviceId:1234" is described in the serviceId element, which indicates a service ID of the proxy service.

The URL "http://192.168.1.1:23456/getATSC3.0ProxyAddressPort" of Web API for acquiring a proxy standby address/port is described in the controlURL element. The URL is information for calling Web API for acquiring a proxy standby address/port indicating an IP address and a port number by which the local proxy 113 waits for a request.

Here, the address of the service description for an ACR client service is generally described in the SCPDURL element, and thus the service description is acquired by the HTTP-defined GET method. In this case, an action message is sent to the URL described in the controlURL element by the UPnP-defined simple object access protocol (SOAP) thereby to call the action.

On the other hand, the present technology proposes a method for knowing URL of Web API in a different manner from UPnP definition in order to more simply call Web API. That is, according to the present technology, nothing is described for a value of the SCPDURL element (the SCPDURL element remains empty) as illustrated in FIG. 23, and URL of Web API can be directly described in the controlURL element only in a case where nothing is described in the SCPDURL element.

Additionally, the conditions for directly describing URL of Web API in the controlURL element may be that the SCPDURL element is empty as described above, and that a dummy character string is described in the controlURL element, for example.

Returning to FIG. 17, in the processing in step S102, the device description response transmitted by the gateway apparatus 10 is received by the client apparatus 20 which has transmitted the device description request.

In step S203, the application 211 requests the proxy standby address/port to the proxy application manager 112 operating in the gateway apparatus 10 connected to the network 30 on the basis of (the URL of Web API for acquiring a proxy standby address/port of) the device description response received from the gateway apparatus 10.

FIG. 24 is a diagram illustrating an exemplary proxy standby address/port request.

A target proxy standby address/port "getATSC3.0ProxyAddressPort" is described as a target resource of the GET method for the proxy standby address/port request. Further, the host name "192.168.1.1:23456" is described for HOST.

That is, the target of the GET method is "getATSC3.0ProxyAddressPort" depending on the contents described in the device description response (contents of the controlURLelement) in the proxy standby address/port request. Further, the IP address "192.168.1.1" of the gateway apparatus 10 and the port number "23456" of the proxy application manager 112 are described as HOST in the proxy standby address/port request.

Returning to FIG. 17, in the processing in step S203, the proxy standby address/port request transmitted by the client apparatus 20 is received by the gateway apparatus 10 connected to the network 30.

In step S111, the proxy application manager 112 generates a proxy standby address/port in response to the proxy standby address/port request received from the client apparatus 20, and returns it as a response to the client apparatus 20 via the network 30.

FIG. 25 is a diagram illustrating an exemplary proxy standby address/port response.

The proxy standby address/port "192.168.1.1:34567" is described in the body part of the proxy standby address/port response.

That is, the local proxy 113 in the gateway apparatus 10 functions as a proxy server, and thus the IP address "192.168.1.1" assigned to the gateway apparatus 10 and the port number "34567" assigned to the local proxy 113 are described in the body part of the response.

Additionally, the example is described assuming that the proxy application manager 112 receives a request for Web API (proxy standby address/port request), but the main body of the local proxy 113 may receive and process the request.

Returning to FIG. 17, in the processing in step S111, the proxy standby address/port response transmitted by the gateway apparatus 10 is received by the client apparatus 20 which has transmitted the proxy standby address/port request.

In step S204 in FIG. 18, the application 211 updates the proxy autoconfiguration script and reflects a configuration change by the activation (reactivation) of the browser 212 on the basis of (the IP address and the port number of) the proxy standby address/port response received from the gateway apparatus 10.

That is, the application 211 in the client apparatus 20 rewrites the proxy autoconfiguration script file by the IP address and the port number (ATSC3.0ProxyAddressPort (192.168.1.1:34567)) acquired as a proxy standby address/port from the proxy standby address/port response.

FIG. 26 is a diagram illustrating an exemplary proxy autoconfiguration script file.

The proxy autoconfiguration script file can be described in a script language JavaScript (registered trademark).

In FIG. 26, the FindProxyForURL function is defined and its arguments url and host can be designated. "PROXY 192.168.1.1:34567:DIRECT," or the proxy standby address/port is described in the else sentence of conditional branching in the FindProxyForURL function. That is, "192.168.1.1" is an IP address assigned to the gateway apparatus 10, and "34567" is a port number assigned to the local proxy 113.

Due to the FindProxyForURL function, specific hosts in the subnet are directly connected to the outside and the other hosts are connected to the outside via the local proxy 113 operating in the gateway apparatus 10. However, the hosts herein include the client apparatus 20.

That is, the proxy autoconfiguration script file is rewritten by the proxy standby address/port by the application 211 in the client apparatus 20, and the browser 212 is activated (reactivated). The IP address and the port number of the proxy are then set (automatically set) by the proxy autoconfiguration script file referred to by the browser 212.

Thereby, the browser 212 in the client apparatus 20 can access the local proxy 113 operating in the gateway apparatus 10 via the network 30.

In step S211, in a case where a timing when distributed content are received via communication is reached with a broadcasting service as a service entry, the browser 212 requests a DASH segment to the local proxy 113 operating in the gateway apparatus 10 via the network 30.

That is, the browser 212 functions as a DASH player for reproducing a DASH segment of content, and all the requests (such as an HTTP request for DASH segment file with the segment URL "http(s)://a.com/a.mp4") from the browser 212 (DASH plyer) in the normal client apparatus 20 (NC) are routed via the local proxy 113.

In the processing in step S211, the HTTP request for DASH segment transmitted by the client apparatus 20 is received by the local proxy 113 operating in the gateway apparatus 10.

In step S121, the local proxy 113 inserts an extension header into the HTTP request received from the client apparatus 20.

That is, the local proxy 113 functions as a transparent proxy and performs the extension header insertion processing thereby to inset the source identification information for identifying the identity of a source of content (identifier for identifying the identity of a source) into the HTTP request from the client apparatus 20. As described above, in the case of ATSC3.0 service, for example, the source identification information to be inserted in the extension header processing can include service ID, content ID, URL of MPD metadata, time information, and the like.

Additionally, in the extension header insertion processing for the ATSC3.0 service, there is performed a processing of confirming whether (the URL of) the HTTP request is the segment URL described in the MPD metadata distributed in the ATSC3.0 service with reference to the previously-generated mapping database before inserting an extension header into the HTTP request for trapped DASH segment file. The processing will be described below in detail with reference to the flowchart of FIG. 27.

In step S122, the local proxy 113 transmits the HTTP request acquired in the processing (extension header insertion processing) in step S121 to the communication server 70 connected to the Internet 80 via the communication I/F 102.

Additionally, though described in detail with reference to FIG. 28, the communication server 70 receives the HTTP request transmitted from the gateway apparatus 10 via the Internet 80. Further, the communication server 70 transmits the DASH segment file to the gateway apparatus 10 via the Internet 80 on the basis of the received HTTP request.

Here, the source identification information such as service ID, content ID, URL of MPD metadata, and time information is inserted into the HTTP request header received from the gateway apparatus 10, and thus the communication server 70 confirms the source identification information thereby to recognize that the HTTP request is requested with the ATSC3.0 service as a service entry.

The DASH segment file transmitted by the communication server 70 is received by the gateway apparatus 10 connected to the Internet 80.

In step S123, the local proxy 113 transfers the DASH segment file received from the communication server 70 to the client apparatus 20 connected to the network 30 via the communication I/F 103.

In the processing in step S123, the DASH segment file transferred by the gateway apparatus 10 is received by the client apparatus 20 connected to the network 30.

In step S212, the browser 212 processes the DASH segment file received from the gateway apparatus 10 and reproduces the DASH segment file by the DASH player. Thereby, the content of a program or the like distributed via communication are reproduced in the client apparatus 20.

A flow of the proxy finding/connection processing and the extension header insertion processing has been described above.

(Details of Extension Header Insertion Processing)

The extension header insertion processing will be described below in detail with reference to the flowchart of FIG. 27.

Figure 27:
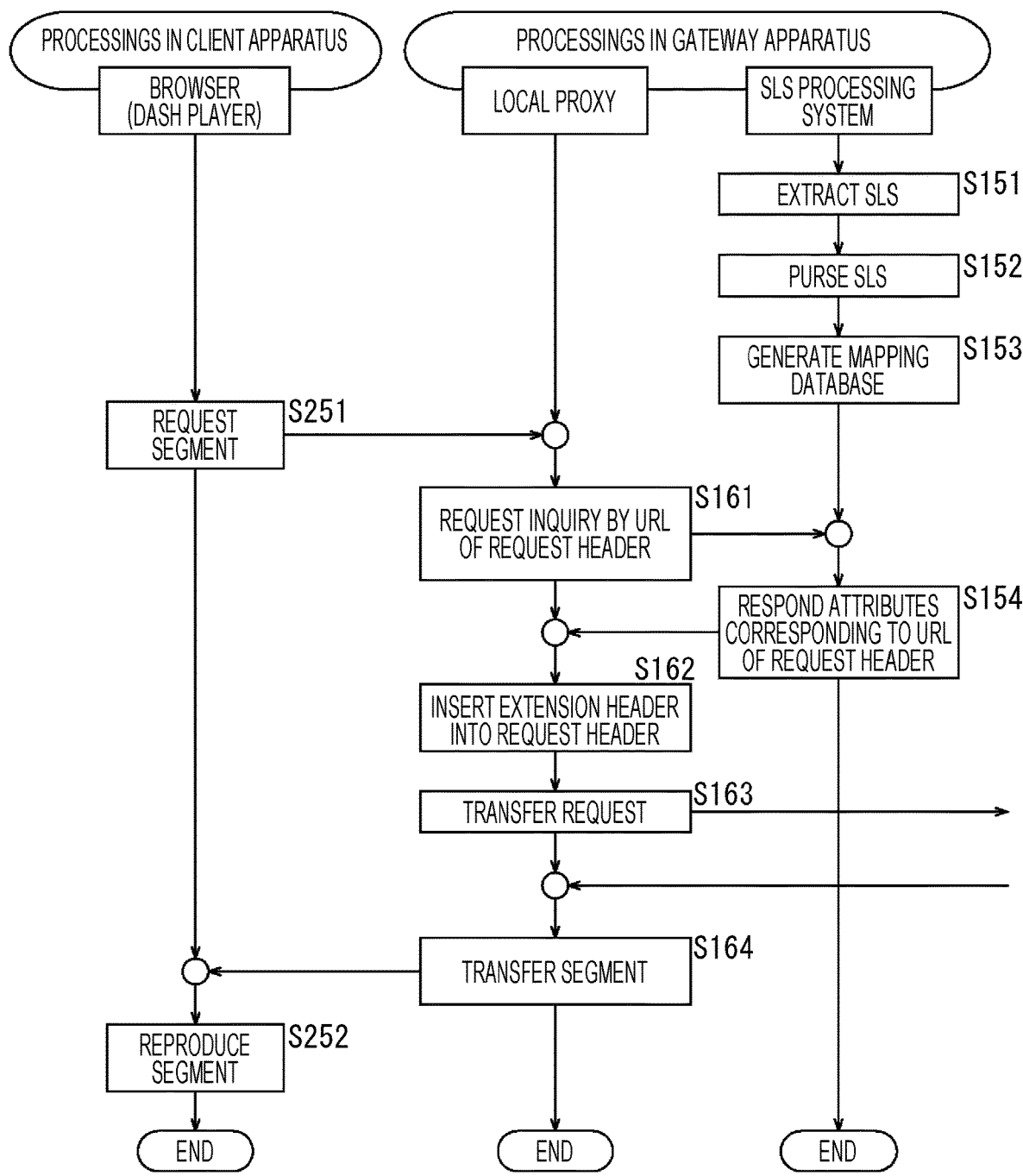
FIG. 27 is a flowchart for explaining the extension header insertion processing in detail.

The processings illustrated in the flowchart of FIG. 27 correspond to the extension header insertion processing out of the proxy finding/connection processing and the extension header insertion processing in FIG. 17 and FIG. 18, and correspond to the processings in steps S121 to S123 and the processings in steps S211 and S212 in FIG. 18.

Incidentally, in FIG. 27, the processings in steps S151 to S154 and the processings in steps S161 to S164 are performed by the gateway apparatus 10. Further, the processings in steps S251 and S252 are performed by the client apparatus 20.

The processings in steps S151 to S153 are performed in the gateway apparatus 10 prior to the extension header insertion processing on an HTTP request by the client apparatus 20, and the mapping database is generated by the SLS processing system 114 and stored in the storage part 104.

Specifically, in step S151, the SLS processing system 114 extracts SLS transmitted in the ROUTE session from a multiplexed stream.

In step S152, the SLS processing system 114 purses SLS acquired in the processing in step S151.

Here, the USBD metadata and the MPD metadata are analyzed so that service ID described by the globalServiceID attribute of the USBD metadata, URI (URL of the MPD metadata) designated by the fullMPDUri attribute, content ID (EIDR or Ad-ID) described in the MPD metadata, and segment URL are acquired.

In step S153, the SLS processing system 114 generates the mapping database on the basis of the analysis result acquired in the processing in step S152. The mapping database is stored in the storage part 104.

The mapping database is directed for solving URL included in the HTTP request from the client apparatus 20 corresponds to which of the DASH segment of a service in the ATSC3.0 service.

Specifically, service ID, content ID, URL of MPD metadata, and time information are associated in the mapping database with segment URL as a main key. That is, the mapping database stores a correspondence between the segment URL and the source identification information. Additionally, the main key is not limited to segment URL, and may use a character string matching with the first part of URL, such as base URL designated by the BaseURL element of the MPD metadata, and the like.

With the mapping database, the SLS processing system 114 can provide the local proxy 113 with the attributes (source identification information) depending on the URL of the HTTP request from the client apparatus 20. In other words, the mapping database is referred to when the extension header insertion processing is performed, thereby confirming whether the URL of the target HTTP request is the segment URL described in the MPD metadata distributed in the ATSC3.0 service before an extension header is inserted.

Here, in a case where a timing when distributed content are received via communication with a broadcasting service as a service entry is reached, the browser 212 in the client apparatus 20 requests the DASH segment to the local proxy 113 operating in the gateway apparatus 10 via the network 30 (S251).

In the processing in step S251, the HTTP request for DASH segment transmitted by the client apparatus 20 is received by the local proxy 113 operating in the gateway apparatus 10.

In step S161, the local proxy 113 requests the SLS processing system 114 to make an inquiry by the URL of the HTTP request header received from the client apparatus 20.

In step S154, the SLS processing system 114 returns the attributes (source identification information) corresponding to the URL of the HTTP request with reference to the mapping database stored in the storage part 104 in response to the inquiry by the URL of the HTTP request header from the local proxy 113.

Here, the source identification information such as service ID, content ID, URL of MPD metadata, and time information with segment URL as a main key is stored in the mapping database, and thus the source identification information associated with the segment URL corresponding to the URL of the HTTP request from the client apparatus 20 is acquired and is returned as the attributes corresponding to the URL of the HTTP request header.

In step S162, the local proxy 113 inserts the attributes (source identification information) returned as an extension header from the SLS processing system 114 into the HTTP request header received from the client apparatus 20. Thereby, the source identification information such as service ID, content ID, URL of MPD metadata, and time information is inserted into the HTTP request header as illustrated in FIG. 16.

In step S163, the local proxy 113 transmits the HTTP request inserted with the extension header to the communication server 70 connected to the Internet 80 via the communication I/F 102.

Additionally, though described below in detail with reference to FIG. 28, the processings performed in the communication server 70 will be briefly described as follows. That is, the communication server 70 receives an HTTP request transmitted from the gateway apparatus 10 via the Internet 80. The communication server 70 then transmits a DASH segment file corresponding to the received HTTP request to the gateway apparatus 10 via the Internet 80.

The DASH segment file transmitted by the communication server 70 is received by the gateway apparatus 10 connected to the Internet 80.

In step S164, the local proxy 113 transfers the DASH segment file received from the communication server 70 to the client apparatus 20 connected to the network 30 via the communication I/F 103.

In the processing in step S164, the DASH segment file transferred by the gateway apparatus 10 is received by the client apparatus 20 connected to the network 30.

The DASH segment file received from the gateway apparatus 10 is reproduced by the browser 212 in the client apparatus 20 (S252). Thereby, the content of a program or the like distributed via communication are reproduced in the client apparatus 20.

The extension header insertion processing has been described above in detail.

In the extension header insertion processing, an extension header (source identification information) is inserted into an HTTP request from the client apparatus 20 by the local proxy 113 operating in the gateway apparatus 10, and thus the source identification information can be easily added to the HTTP request. That is, the processing of adding such a special header to an HTTP request cannot be easily implemented on the normal DASH player (browser 212), but the HTTP request is routed via the local proxy 113 so that the extension header insertion processing can be easily implemented by a module, server-side script, or the like on the local proxy 113.

(Processings for HTTP Request)

A flow of processings for HTTP request performed by the communication server 70 will be described below with reference to the flowchart of FIG. 28.

Figure 28:
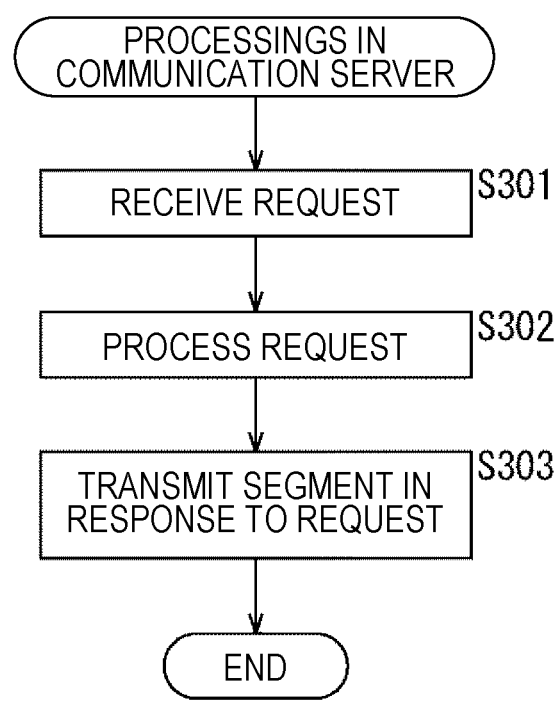
FIG. 28 is a flowchart for explaining a flow of processings for HTTP request on a communication server.

The processings illustrated in the flowchart of FIG. 28 are a processing corresponding to the processing in step S122 (the HTTP request transfer processing by the local proxy 113) in the proxy finding/connection processing and the extension header insertion processing in FIG. 17 and FIG. 18, or a processing corresponding to the processing in step S163 (the HTTP request transfer processing by the local proxy 113) in the extension header insertion processing in FIG. 27.

In step S301, the communication server 70 receives an HTTP request transmitted from (the local proxy 113 of) the gateway apparatus 10 via the Internet 80.

In step S302, the communication server 70 processes the HTTP request acquired in the processing in step S301.

Here, the source identification information such as service ID, content ID, URL of MPD metadata, and time information is inserted into the HTTP request header. The communication server 70 can recognize that the HTTP request is requested with a broadcasting service as a service entry on the basis of the source identification information inserted into the HTTP request header.

That is, in a case where the source identification information as an extension header is not inserted into the HTTP request from the gateway apparatus 10, the communication server 70 cannot recognize whether the HTTP request for DASH segment file with the segment URL "http(s)://a.com/a.mp4" is made with a broadcasting service such as ATSC3.0 service as a service entry, for example.

On the other hand, in a case where the source identification information as an extension header is inserted into the HTTP request from the gateway apparatus 10, the communication server 70 can recognize whether the HTTP request is made with a broadcasting service such as ATSC3.0 service as a service entry on the basis of service ID, content ID, URL of MPD metadata, time information, and the like.

For example, in a case where services using broadcasting and communication are served, for example, in a case where simul-broadcasting using broadcasting and communication is performed or in a case where content acquired by combining streams transmitted via broadcasting and communication are distributed, there may be a timing at which the client apparatus 20 may receive content distributed via communication with a broadcasting service as a service entry. Then in such a case, a business operator such as a broadcaster requests to identify the client apparatus 20 which accesses via communication with a broadcasting service as a service entry, and the request can be met. For example, the broadcaster can discriminate the ATSC3.0 end device from the normal end device thereby to easily manage the access statistics.

Further, the communication server 70 is provided as a CDN server herein thereby to record the access statistics of the DASH segment by use of the logging function of an existing CDN when the communication server 70 distributes the content data (DASH segment file). Further, the communication server 70 uses the function of an existing CDN thereby to minimize additional cost. Further, for example, in a case where the same content are distributed from different CDN servers in different distribution source paths, the DASH segment sequence generated by the same content can be easily estimated.

Additionally, the operation "content acquired by combining streams transmitted via broadcasting and communication are distributed" is that a low-quality video stream is distributed as a base layer via broadcasting and additional information for enhancing a video stream as a base layer (enhance video stream) is distributed as an enhancement layer via communication, for example. Thereby, the client apparatus 20 can reproduce not only a normal-quality video (such as 2K-resolution video) corresponding to the base layer but also a high-quality video (such as 4K-resolution video) acquired by combining the base layer and the enhancement layer.

In step S303, the communication server 70 transmits the DASH segment file in response to the HTTP request acquired in the processing in step S301 to the gateway apparatus 10 via the Internet 80.

A flow of processings for HTTP request on the communication server 70 has been described above.

<6. Variants>

(Applications to Other Broadcasting Standards)

In the above description, ATSC (particularly ATSC3.0) employed in the U.S. and the like has been described as a digital broadcasting standard, but the present technology may be applied to ISDB employed in Japan and the like or DVB or the like employed in European countries and the like. Further, the above description has been made by way of ATSC3.0 employing the IP transmission system, but the present technology may be applied to other systems such as MPEG2-transport stream (TS) system, for example, not limited to the IP transmission system.

Further, for the digital broadcasting standards, the present technology may be applied to standards of satellite broadcasting using broadcasting satellite (BS), communications satellite (CS), or the like, wired broadcasting such as cable TV (CATV), and the like, in addition to terrestrial broadcasting.

(Other Variants)

Further, the names of control information (signaling) described above are exemplary, and other names may be used. However, a difference in names is formal, and substantial contents of target control information, packet, or the like are not different. For example, user service bundle description (USBD) may be referred to as user service description (USD). Further, for example, non real time (NRT) may be referred to as locally cached content (LCC) or the like.

Further, in a case where control information is described in a markup language such as XML, the names of its elements or attributes are exemplary and other names may be employed. However, a difference in names is formal, and substantial contents of the elements or attributes are not different.

Further, the DASH player may be an application developed in a markup language such as hypertext markup language 5 (HTML5) or the like or a script language such as JavaScript (registered trademark), or an application developed in a programming language such as Java (registered trademark), for example. Further, the applications are not limited to applications executed by the browser, and may be executed as so-called native applications in the operating system (OS) environment or the like.

Additionally, the applications not only demonstratively display some information, but may be operated in a hidden manner (in the background) (may be activated without end user's recognition). Further, the content may include all content such as electronic books, games, advertisements, and the like in addition to moving pictures or music.

<7. Configuration of Computer>

Figure 29:
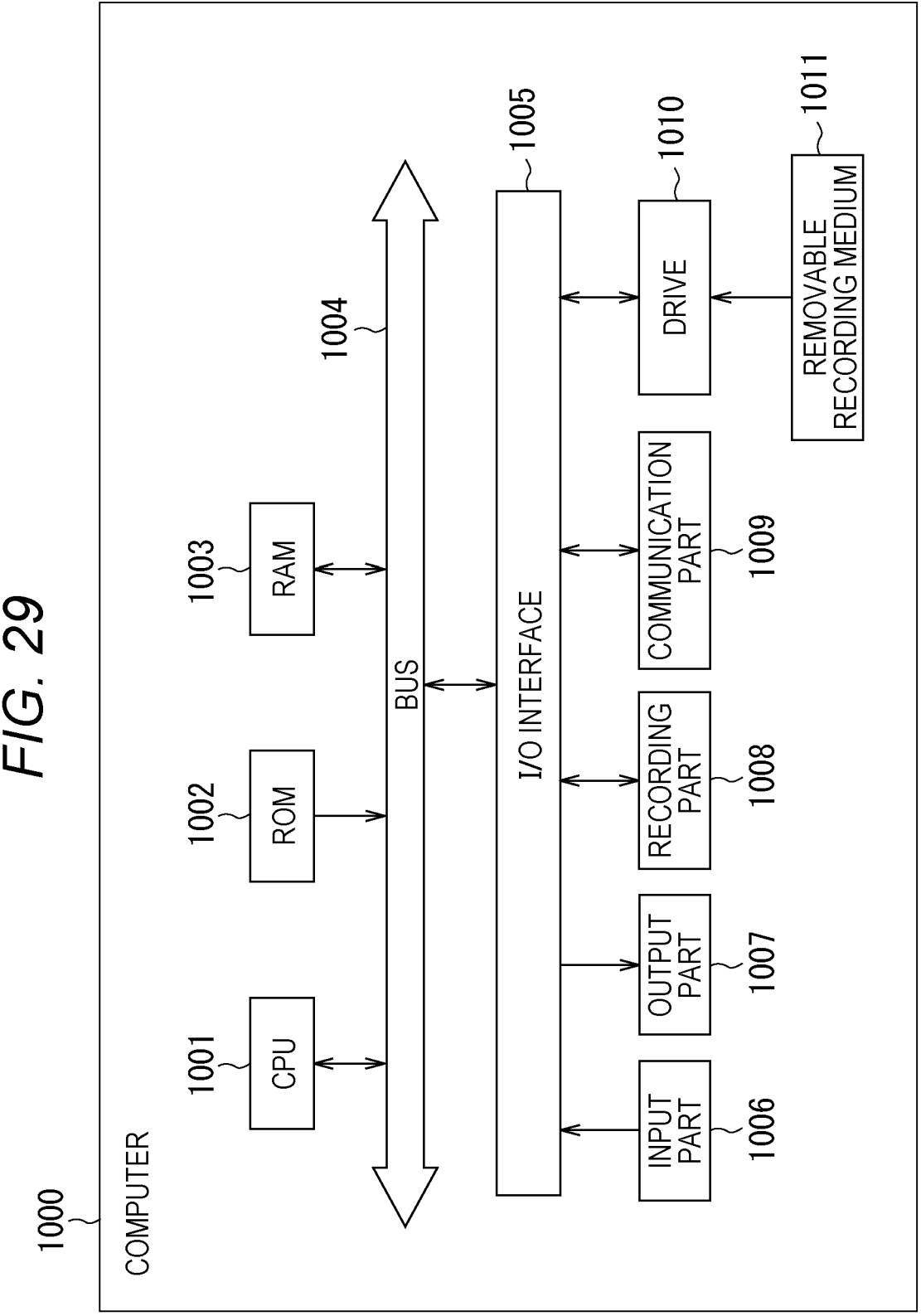
FIG. 29 is a diagram illustrating an exemplary configuration of a computer.

A series of processings described above can be performed in hardware and in software. In a case where the series of processings is performed in software, programs configuring the software are installed in a computer. FIG. 29 is a diagram illustrating an exemplary hardware configuration of a computer for performing the series of processings by the programs.

A central processing unit (CPU) 1001, a read only memory (ROM) 1002, and a random access memory (RAM) 1003 are mutually connected via a bus 1004 in a computer 1000. The bus 1004 is further connected with an I/O interface 1005. The I/O interface 1005 is further connected with an input part 1006, an output part 1007, a recording part 1008, a communication part 1009, and a drive 1010.

The input part 1006 is configured of a keyboard, a mouse, a microphone, and the like. The output part 1007 is configured of a display, a speaker, and the like. The recording part 1008 is configured of a hard disc, a nonvolatile memory, or the like. The communication part 1009 is configured of a network interface or the like. The drive 1010 drives a removable recording medium 1011 such as magnetic disc, optical disc, magnetooptical disc, or semiconductor memory.

In the thus-configured computer 1000, the CPU 1001 loads and executes the programs recorded in the ROM 1002 or the recording part 1008 into the RAM 1003 via the I/O interface 1005 and the bus 1004 so that the series of processings are performed.

The programs executed by the computer 1000 (the CPU 1001) can be recorded in the removable recording medium 1011 as a package medium or the like, for example, to be provided. Further, the programs can be provided via a wired or wireless transmission medium such as local area network, the Internet, or digital satellite broadcasting.

The removable recording medium 1011 is mounted on the drive 1010 in the computer 1000 so that the programs can be installed in the recording part 1008 via the I/O interface 1005. Further, the programs can be received by the communication part 1009 via a wired or wireless transmission medium and installed in the recording part 1008. Additionally, the programs can be previously installed in the ROM 1002 or the recording part 1008.

Here, in the present specification, the processings performed by the computer according to the programs do not necessarily performed in time series in the orders described in the flowcharts. That is, the processings performed by the computer according to the programs also include processings performed in parallel or individually (such as parallel processings or processings by objects). Further, the programs may be processed in one computer (processor), or may be distributed and processed in a plurality of computers.

Additionally, embodiments of the present technology are not limited to the above embodiment, and can be variously changed without departing from the spirit of the present technology.

Further, the present technology can take the following configurations.

(1) An information processing apparatus including:
a processing part configured to insert identification information for identifying the identity of a source of content into a request for the content.

(2) The information processing apparatus according to (1),
in which in a case where the request is transmitted via communication with a broadcasting service as a service entry, the processing part inserts the identification information into the request.

(3) The information processing apparatus according to (1) or (2),
in which the identification information is an information for identifying a distribution source of the content.

(4) The information processing apparatus according to (3),
in which the identification information includes at least an identifier for identifying the broadcasting service.

(5) The information processing apparatus according to (4),
in which the identification information further includes at least one item of information among an identifier for identifying the content, information indicating an acquisition source of control information for controlling reproducing the content, and time information associated with the content.

(6) The information processing apparatus according to any of (1) to (5),
in which the processing part functions as a proxy.

(7) The information processing apparatus according to (6), further including:
a reception part configured to receive a broadcasting wave; and
a communication part configured to make communication with a server on Internet,
in which the processing part generates a mapping database storing the identification information on the basis of control information acquired from the broadcasting wave,
the processing part inserts the identification information acquired from the mapping database into a request header of a hypertext transfer protocol (HTTP) request when transmitting the HTTP request to the server, and
the communication part transmits the HTTP request to the server via the Internet.

(8) The information processing apparatus according to (7), the information processing apparatus being a gateway apparatus configured to transfer content distributed via broadcasting or via communication to a client apparatus connected to a network,
in which when transmitting an HTTP request from the client apparatus to the server, the processing part inserts the identification information into the request header of the HTTP request.

(9) The information processing apparatus according to (7), the information processing apparatus being a client apparatus configured to reproduce content distributed via broadcasting or via communication,
in which when transmitting an HTTP request from the client apparatus or an HTTP request from other client apparatus connected to a network to the server, the processing part inserts the identification information into the request header of the HTTP request.

(10) The information processing apparatus according to (8),
in which in a case where connection with the client apparatus is established, the processing part provides the client apparatus with connection information associated with an IP address and a port number by which the proxy waits for a request.

(11) The information processing apparatus according to (10),
in which the client apparatus rewrites contents of a script file for setting a configuration of the proxy by the connection information, and executes the script file to establish connection with the proxy.

(12) The information processing apparatus according to (11),
in which in a case where application programming interface (API) for acquiring the connection information is executed by the client apparatus, the processing part provides the client apparatus with the connection information.

(13) The information processing apparatus according to any of (6) to (12),
in which the request is communicated by use of a secure protocol, and
the proxy is a transparent proxy.

(14) A data processing method in an information processing apparatus, including:
by the information processing apparatus, a step of inserting identification information for identifying the identity of a source of content into a request for the content.

(15) A client apparatus including:
a processing part configured to process connection with a gateway apparatus configured to transfer content distributed via broadcasting or via communication; and
a reproduction part configured to reproduce the content transferred from the gateway apparatus via a network,
in which the gateway apparatus functions as a proxy, and
the processing part establishes connection with the proxy on the basis of connection information associated with an IP address and a port number by which the proxy waits for a request, the connection information being provided from the gateway apparatus via the network.

(16) The client apparatus according to (15),
in which the processing part rewrites contents of a script file for setting a configuration of the proxy by the connection information and executes the script file to establish connection with the proxy.

(17) The client apparatus according to (16),
in which the processing part executes API for acquiring the connection information provided from the gateway apparatus via the network to acquire the connection information.

(18) The client apparatus according to (17),
in which when transmitting a request for content from the client apparatus to a server on Internet, the proxy inserts identification information for identifying identity of a source of the content into the request.

(19) The client apparatus according to (18),
in which in a case where the request is transmitted via communication with a broadcasting service as a service entry, the proxy inserts the identification information into the request.

(20) A data processing method in a client apparatus, including:
by the client apparatus, in a case where connection with a gateway apparatus configured to transfer content distributed via broadcasting or via communication is established, a step of establishing connection with the proxy on the basis of connection information associated with an IP address and a port number by which the proxy waits for a request, the connection information being provided from the gateway apparatus functioning as a proxy via a network; and
reproducing the content transferred from the gateway apparatus via the network.

REFERENCE SIGNS LIST

1 Transmission system
10 Gateway apparatus
20-1 to 20-N, 20 Client apparatus
30 Network
40 Broadcasting server
50 Transmission station
60 Broadcasting transmission path
70 Communication server
80 Internet
100 Processing part
101 Tuner
102 Communication I/F
103 Communication I/F
104 Storage part
111 UPnP/SSDP server
112 Proxy application manager
113 Local proxy
114 SLS processing system
200 Processing part
201 Communication I/F
202 Display part
203 Speaker
211 Application
212 Browser
1000 Computer
1001 CPU

The invention claimed is:

1. An information processing apparatus comprising:
circuitry configured to:
acquire control information from a broadcast wave using an Internet protocol transmission system, wherein the control information includes low level signaling or service layer signaling transmitted in a layer of the Internet protocol transmission system; and
execute browser functions as a DASH player; and
a local proxy configured:
to be accessed by the DASH player;
to communicate with a server on the Internet;
to send a request including segment information of content to the server when the request is transmitted via communication with a broadcasting service as a service entry, the request includes a proxy standby address request; and
to insert identification information for identifying identity of a source of the content into the request, wherein the identification information includes at least a service identifier included in the low level signaling or the service layer signaling for identifying the broadcasting service.

2. The information processing apparatus according to claim 1,
wherein the identification information is information for identifying a distribution source of the content.

3. The information processing apparatus according to claim 2,
wherein the identification information further includes at least one item of information among an identifier for identifying the content, information indicating an acquisition source of control information for controlling reproducing the content, and time information associated with the content.

4. The information processing apparatus according to claim 1,
wherein the circuitry is further configured to generate a mapping database storing the identification information on a basis of the control information acquired from the broadcast wave,
the local proxy is further configured to insert the identification information acquired from the mapping database into a request header of a hypertext transfer protocol (HTTP) request when transmitting the HTTP request to the server, and
the local proxy is further configured to send the HTTP request to the server via the Internet.

5. The information processing apparatus according to claim 4,
wherein the information processing apparatus is a gateway apparatus configured to transfer content distributed via broadcasting or via communication to a client apparatus connected to a network, and
wherein when sending an HTTP request from the client apparatus to the server, the local proxy inserts the identification information into the request header of the HTTP request.

6. The information processing apparatus according to claim 5,
wherein in a case where connection with the client apparatus is established, the circuitry provides the client apparatus with connection information associated with an IP address and a port number by which the information processing apparatus waits for a request.

7. The information processing apparatus according to claim 6,
wherein the client apparatus rewrites contents of a script file for setting a configuration of the information processing apparatus by the connection information, and executes the script file to establish connection with the information processing apparatus.

8. The information processing apparatus according to claim 7,
wherein in a case where application programming interface (API) for acquiring the connection information is executed by the client apparatus, the circuitry provides the client apparatus with the connection information.

9. The information processing apparatus according to claim 4,
wherein the information processing apparatus is a client apparatus configured to reproduce content distributed via broadcasting or via communication, and
wherein when sending an HTTP request from the client apparatus or an HTTP request from another client apparatus connected to a network to the server, the local proxy inserts the identification information into the request header of the HTTP request.

10. The information processing apparatus according to claim 1,
wherein the request is communicated by use of a secure protocol, and the local proxy is a transparent proxy.

11. The information processing apparatus according to claim 1,
wherein the proxy standby address request causes a response from the server that permits the information processing apparatus to recognize an interface of the source.

12. The information processing apparatus according to claim 1,
wherein the proxy standby address request employs a GET method.

13. The information processing apparatus according to claim 1,
wherein the response to the proxy standby address request is received over the Internet.

14. The information processing apparatus according to claim 1,
wherein the response to the proxy standby address request includes a host name.

15. A data processing method performed by an information processing apparatus, comprising:
acquiring control information from a broadcast wave using an Internet protocol transmission system, wherein the control information includes low level signaling or service layer signaling transmitted in a layer of the Internet protocol transmission system;
executing browser functions as a DASH player;
communicating with a server on the Internet via a local proxy that is accessed by the DASH player;
sending via the local proxy a request including segment information of content to the server when the request is transmitted via communication with a broadcasting service as a service entry, the request includes a proxy standby address request, and inserting via the local proxy identification information for identifying identity of a source of the content into the request, wherein the identification information includes at least an identifier included in the low level signaling or the service layer signaling for identifying the broadcasting service.

16. A client apparatus comprising:
circuitry configured to:
process a connection with a gateway apparatus configured to transfer content distributed via broadcasting or via communication;
execute browser functions as a DASH player; and
reproduce the content transferred from the gateway apparatus via a network,
wherein the gateway apparatus functions as a proxy, the circuitry establishes connection with the proxy on a basis of connection information associated with an IP address and a port number by which the proxy waits for a request, the connection information being provided from the gateway apparatus via the network, the gateway apparatus acquires control information from a broadcast wave using an Internet protocol transmission system, the control information includes low level signaling or service layer signaling transmitted in a layer of the Internet protocol transmission system; and
a local proxy that is accessed by the DASH player configured to
communicate with a server on the Internet;
to send a request including segment information of the content to the server when the request is transmitted via communication with a broadcasting service as a service entry, the request includes a proxy standby address request, and
to insert identification information for identifying identity of a source of the content into the request, wherein the identification information includes at least an identifier included in the low level signaling or the service layer signaling for identifying the broadcasting service.

17. The client apparatus according to claim 16, wherein the circuitry rewrites contents of a script file for setting a configuration of the proxy by the connection information and executes the script file to establish connection with the proxy.

18. The client apparatus according to claim 17, wherein the circuitry executes API for acquiring the connection information provided from the gateway apparatus via the network to acquire the connection information.

19. The client apparatus according to claim 16, wherein in a case where the request is transmitted via the communication with the broadcasting service as the service entry, the proxy inserts the identification information into the request.

20. A data processing method in a client apparatus, comprising:

by the client apparatus, in a case where connection with a gateway apparatus configured to transfer content distributed via broadcasting or via communication is established, establishing connection with a proxy on a basis of connection information associated with an IP address and a port number by which the proxy waits for a request, the connection information being provided from the gateway apparatus functioning as a proxy via a network;

reproducing the content transferred from the gateway apparatus via the network, wherein the gateway apparatus acquires control information from a broadcast wave using an Internet protocol transmission system, the control information includes low level signaling or service layer signaling transmitted in a layer of the Internet protocol transmission system;

communicating with a server on the Internet via a local proxy that is accessed by a DASH player which executes browser functions; and sends via the local proxy a request including segment information of the content to the server, the request includes a proxy standby address request, and inserts identification information for identifying identity of a source of the content into the request, wherein the identification information includes at least an identifier included in the low level signaling or the service layer signaling for identifying the broadcasting service.

\* \* \* \* \*